(12) United States Patent
Remboski et al.

(10) Patent No.: US 11,590,840 B2
(45) Date of Patent: Feb. 28, 2023

(54) LUBRICANT SUPPORTED ELECTRIC MOTOR ASSEMBLY FOR COMPACT, POWER DENSE WHEEL-END APPLICATIONS

(71) Applicant: Electric Propulsion Technologies, LLC, Farmington Hills, MI (US)

(72) Inventors: Donald Remboski, Ann Arbor, MI (US); Mark Versteyhe, Oostkamp (BE); Gary Rogers, Novi, MI (US); Gorazd Gotovac, Ljubljana (SI); Marko Podgorelec, Ljubljana (SI); Sebastjan Erčulj, Videm-Dobrepolje (SI); Blaž Grafenauer, Ljubljana (SI); Gašper Šušteršič, Ljubljana Sentvid (SI); Martin Strojnik, Domžale (SI)

(73) Assignee: ELECTRIC PROPULSION TECHNOLOGIES, LLC, Farmington Hills, MI (US)

(*) Notice: Subject to any disclaimer, the term of this patent is extended or adjusted under 35 U.S.C. 154(b) by 0 days.

(21) Appl. No.: 17/575,677

(22) Filed: Jan. 14, 2022

(65) Prior Publication Data

US 2022/0221048 A1 Jul. 14, 2022

Related U.S. Application Data

(60) Provisional application No. 63/137,200, filed on Jan. 14, 2021.

(51) Int. Cl.
*B60K 17/04* (2006.01)
*B60K 7/00* (2006.01)

(52) U.S. Cl.
CPC .......... *B60K 17/046* (2013.01); *B60K 7/0007* (2013.01); *B60K 2007/0038* (2013.01); *B60K 2007/0092* (2013.01)

(58) Field of Classification Search
None
See application file for complete search history.

(56) References Cited

U.S. PATENT DOCUMENTS

| 2,937,294 A | 5/1960 | Macks |
| 6,358,176 B1 | 3/2002 | Nauheimer et al. |

(Continued)

FOREIGN PATENT DOCUMENTS

| CN | 109469714 A | 3/2019 |
| WO | 2017126965 A1 | 7/2017 |

*Primary Examiner* — Timothy Hannon
(74) *Attorney, Agent, or Firm* — Dickinson Wright PLLC

(57) ABSTRACT

A lubricant supported electric motor assembly includes an electric motor module, a shifting and first stage module, and a final drive module sequentially operably interconnected with one another for producing drive torque that is ultimately conducted to a wheel of a vehicle. The electric motor module includes a stator and a rotor defining an internal rotor cavity. The shifting and first stage module is disposed within the internal rotor cavity and includes a first planetary gear reducer assembly and an output gear selectively coupleable to said first planetary gear reducer assembly. The final drive module is disposed adjacent the shifting and first stage module and includes a second planetary gear reducer assembly operably coupled with the output gear. A shifting mechanism establishes selective coupling between the first planetary gear assembly and the output gear to transfer adjustable torque from the shifting and first stage module to the final drive device.

17 Claims, 18 Drawing Sheets

(56) References Cited

U.S. PATENT DOCUMENTS

| | | |
|---|---|---|
| 7,445,067 B2 | 11/2008 | Marsh et al. |
| 2002/0117916 A1* | 8/2002 | Terada .................... B62M 7/12 |
| | | 310/68 B |
| 2005/0236198 A1* | 10/2005 | Jenkins ................ B60K 7/0007 |
| | | 180/65.51 |
| 2013/0049439 A1 | 2/2013 | Yamada et al. |
| 2019/0093757 A1* | 3/2019 | Remboski ........... F16H 57/0476 |
| 2020/0044511 A1 | 2/2020 | Remboski et al. |
| 2020/0130408 A1 | 4/2020 | Remboski et al. |
| 2020/0378476 A1* | 12/2020 | Huang ................... F16D 23/02 |

* cited by examiner

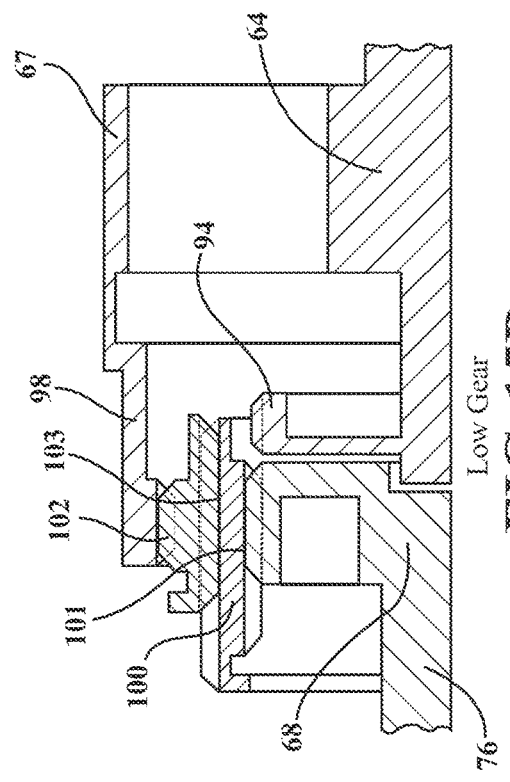
FIG. 15A High Gear
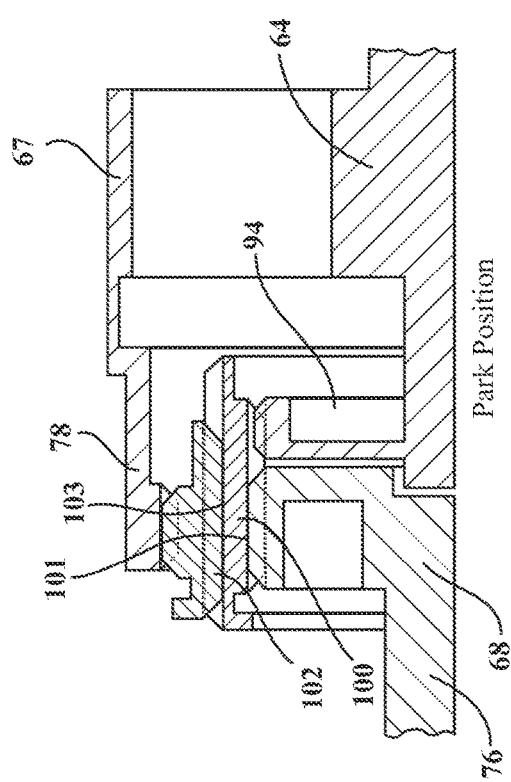
FIG. 15B Low Gear
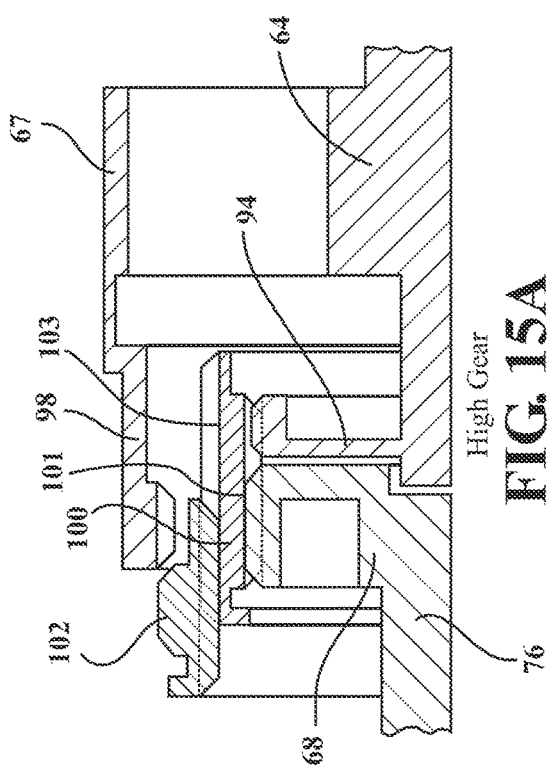
FIG. 15C Neutral Position
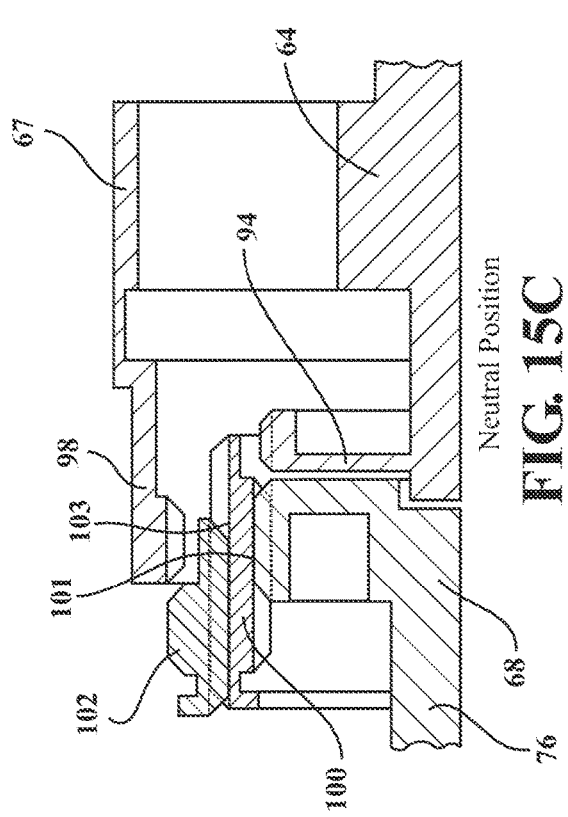
FIG. 15D Park Position

LUBRICANT SUPPORTED ELECTRIC MOTOR ASSEMBLY FOR COMPACT, POWER DENSE WHEEL-END APPLICATIONS

CROSS-REFERENCE TO RELATED APPLICATION

The subject application claims priority to U.S. Provisional Patent Application Ser. No. 63/137,200 filed on Jan. 14, 2021, the entire disclosure of which is incorporated herein by reference.

FIELD OF THE DISCLOSURE

The present disclosure relates generally to electric devices, such as electric motors. More specifically, the present disclosure relates generally to a lubricant supported electric motor assembly for use in a wheel-end electric drive vehicular powertrain application.

BACKGROUND OF THE INVENTION

This section provides a general summary of background information and the comments and examples provided in this section are not necessarily prior art to the present disclosure.

Various drivelines in automotive, truck, and certain off-highway applications take power from a central prime mover and distribute the power to the wheels using mechanical devices such as transmissions, transaxles, propeller shafts, and live axles. These configurations work well when the prime mover can be bulky or heavy, such as, for example, various internal combustion engines ("ICE"). However, more attention is being directed towards alternative arrangements of prime movers that provide improved environmental performance, eliminate mechanical driveline components, and result in a lighter-weight vehicle with more space for passengers and payload.

"On wheel", "in-wheel" or "near-wheel" motor configurations (i.e, wheel-end electric motors) are one alternative arrangement for the traditional ICE prime mover that distribute the prime mover function to each or some of the plurality of wheels via one or more electric motors disposed on, within, or proximate to the plurality of wheels. For wheel end drives packaged in a harsh wheel-end environment, robustness to shock and vibration are important. However, to meet these harsh conditions, the wheel-end electric motors often incorporate large, heavy components, and thus become heavy and bulky, resulting in electric motors that require more space than desired. In other words, to meet the requisite shock and vibration requirements, current electric motors often consume valuable space and generally are required to increase the overall mass and weight of the electric motor. Yet, in wheel-end electric drive vehicular powertrain applications, minimal package volume is an important feature and consideration.

In addition to smaller package volume, high torque density (per kg and per liter), higher power density, lower current requirements of power-electronics, lower cost, functional safety/fail safe and greater efficiency are additional important considerations for wheel-end electric motors. Prior art designs address some of these other considerations through the reduction of ohmic losses, improved magnetics, very high-speed motor operation, high diameter motors, and/or improvements in minimized cross-section of support structures. Yet, while these prior art wheel end electric drive configurations may be able to meet some of the requirements for wheel-end electric drive vehicular powertrain applications, the current approaches still do not adequately consider the tradeoffs of motor magnetic and electric structures with elements in the powertrain mechanical system. Accordingly, there remains a continuing need for wheel-end electric drive motors which improve performance during operation in high shock and vibration environments, while providing the lighter and smaller footprint sought, as well as addressing all of the other important considerations and needs when the electric drive motor is implemented in a wheel-end electric drive vehicular powertrain application.

SUMMARY OF THE INVENTION

The subject invention is generally directed to a lubricant supported electric motor assembly for use in a wheel-end electric drive vehicular powertrain application. The lubricant supported electric motor assembly is modular in design, and includes an electric motor module, a shifting and first stage module, and a final drive module sequentially operably interconnected with one another for producing adjustable drive torque that is ultimately conducted to a wheel of a vehicle.

The electric motor module includes a stator and a rotor rotatably disposed within the stator to define a gap therebetween. A lubricant is disposed in the gap for supporting the rotor relative to the stator. The rotor extends along an axis between a first rotor end and a second rotor end to present an inner rotor surface that defines an internal rotor cavity. The shifting and first stage module is disposed within the internal rotor cavity and includes a first planetary gear reducer assembly operably connected with the rotor for rotation therewith. The shifting and first stage module includes an output gear that is rotatably aligned on the axis and selectively coupleable to said first planetary gear reducer assembly for selective rotation therewith. The final drive module is disposed adjacent the shifting and first stage module and includes a second planetary gear reducer assembly operably coupled with the output gear for rotation therewith. The shifting and first stage module includes a shifting mechanism configured to establish the selective coupling between the first planetary gear assembly and the output gear to transfer adjustable torque from the shifting and first stage module to the final drive device.

The lubricant supported electric motor assembly results in a smaller package size, lighter weight, better torque and power density, and lower cost compared to the prior wheel-end electric drive motors. In addition, the lubricant supported electric motor assembly provides compatibility with existing suspensions, wheels and foundation brakes that allow the fitment of the lubricant supported electric motor assembly in an existing vehicle without extensive re-design work. Other advantages will be appreciated in view of the following more detailed description of the subject invention.

BRIEF DESCRIPTION OF THE DRAWINGS

The drawings described herein are for illustrative purposes only of selected aspects and not all possible implementations, and are not intended to limit the scope of the present disclosure.

FIG. 15A illustrates a high gear condition for the low and high speed slider clutches;

FIG. 15B illustrates a low gear condition for the low and high speed slider clutches;

FIG. 15C illustrates a neutral condition for the low and high speed slider clutches;

FIG. 15D illustrates a park condition for the low and high speed slider clutches;

DETAILED DESCRIPTION OF THE ENABLING EMBODIMENTS

Exemplary aspects of the lubricant supported electric motor assembly in accordance with the present disclosure will now be more fully described. Each of these example embodiments are provided so that this disclosure is thorough and fully conveys the scope of the inventive concepts, features and advantages to those skilled in the art. To this end, numerous specific details are set forth such as examples of specific components, devices and mechanisms associated with the lubricant supported electric motor assembly to provide a thorough understanding of each of the embodiments associated with the present disclosure. However, as will be apparent to those skilled in the art, not all specific details described herein need to be employed, the example embodiments may be embodied in many different forms, and thus should not be construed or interpreted to limit the scope of the disclosure.

Figure 1:
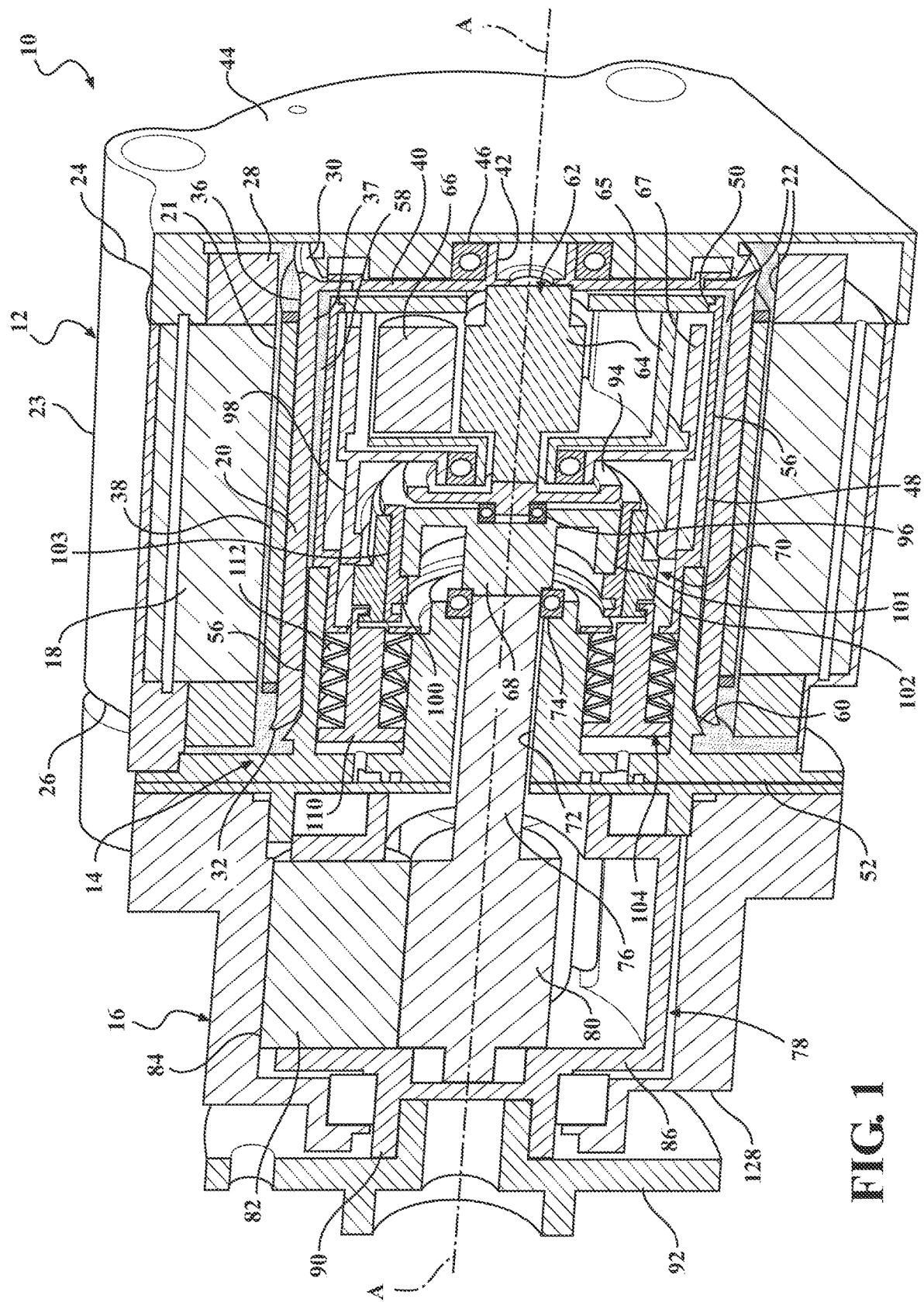
FIG. 1 is a perspective cross-sectional view of a lubricant supported electric motor assembly including a electric motor module, a shifting and first stage module and a final drive module operably interconnected to one another for producing adjustable drive torque which is ultimately conducted to a wheel of a vehicle.

FIGS. 1-25 illustrate a lubricant supported electric motor assembly 10 in accordance with an aspect of the disclosure. As best illustrated in FIG. 1, the lubricant supported electric motor assembly 10 is modular in design, and includes an electric motor module 12, a shifting and first stage module 14, and a final drive module 16 sequentially operably interconnected with one another for producing adjustable drive torque that is ultimately conducted to a wheel of a vehicle. As will be appreciated in view of the following more detailed disclosure, the modularity of the lubricant supported electric motor assembly 10 results in a design which allows for easy substitution of motor structures (as provided through the electric motor module 12), first stage reduction structures (as provided through the shifting and first stage module 14), and final reduction structures (as provided through the final drive module 16). This modularity advantageously allows the lubricant supported electric motor assembly 10 to accurately match a powertrain requirement by choosing the correct modules from a library of module designs. For example, in a vehicular powertrain application with a restricted speed range requirement, such as a city delivery vehicle, the shifting and first stage module 14 may not require the two-speed shift capability that will be described in more detail below. In this case, a shifting and first stage module 14 without the two-speed shift mechanism can be used, resulting in reduced weight and cost. In another powertrain application with different power and torque requirements, a different motor may be used in the electric motor module 12 to optimally match the powertrain application. Thus, the lubricant supported electric motor assembly 10 provides manufacturing and design flexibility not afforded by the prior art wheel-end electric motor assemblies.

As will be also be appreciated in view of the following more detailed description, as well as illustrated in the accompanying Figures, the modularity of the lubricant supported electric motor assembly 10 provides for ease of assembly, repair and replacement. More specifically, the electric motor module 12, the shifting and first stage module 14 and the final drive module 16 can each be built as sub-assemblies and later integrated into or operably coupled with one another to build the lubricant supported electric motor assembly 10. The various modules 12, 14, 16 may even be delivered separately, and assembled as needed, leading to more efficient assembly at an OEM. This modularity also furthers the ability for a flexible construction of a variety of wheel-end drives for different applications from the same manufacturing process. For example, replacement of the electric motor module 12 and the final drive module 16 with alternatively arranged modules instantly leads to a new device with different properties, and thus cheaper customization in terms of NRE and production. This modular structure of the lubricant supported electric motor assembly 10 also provides for easier servicing, repairability, replacement and refurbishment of the individual modules 12, 14, 16 for vehicles in the field. In other words, compared to traditional wheel-end drives, the modular structure provides better servicing with easier access to components.

Figure 2:
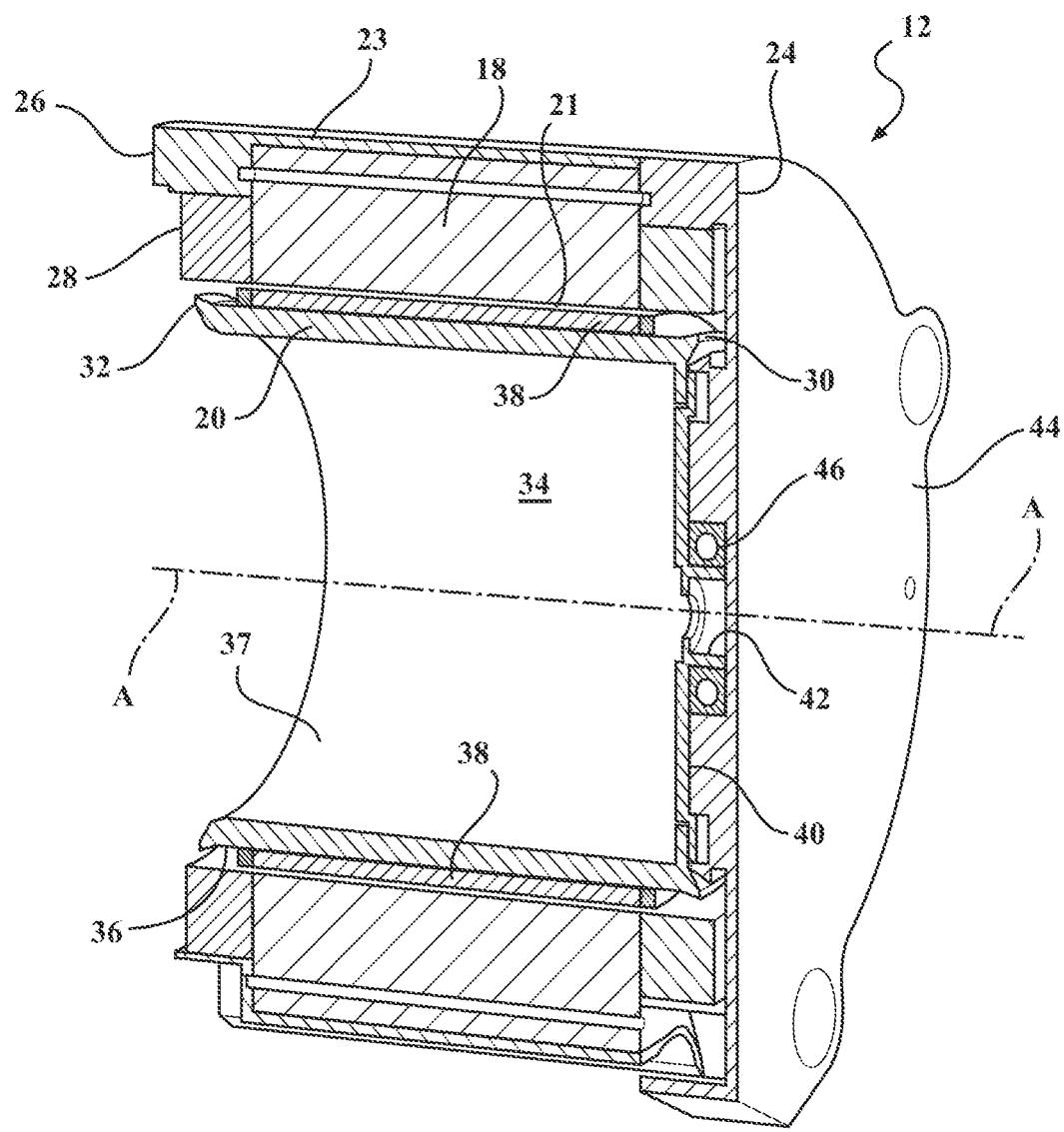
FIG. 2 is a perspective cross-sectional view of the electric motor module.

As best illustrated in FIGS. 1-2, the electric motor module 12 includes a stator 18 extending concentrically around an axis A, and a rotor 20 extending concentrically along the axis A and movably (i.e, rotatably) disposed within the stator 18 to define a first gap 21 therebetween. The rotor 20 and the stator 18 of the electric motor module 12 produce drive torque in response to rotation of the rotor 18, which is ultimately conducted to a wheel of a vehicle as will be described in more detail below. A lubricant 22 is disposed in the first gap 21 for presenting a first lubricant bearing surface/structure that supports the rotor 20 within the stator 18, and provides continuous contact between these components. The lubricant 22 may therefore act as a buffer (e.g., suspension) between the stator 18 and the rotor 20 minimizing or preventing contact therebetween. In other words, the lubricant 22 is pressurized with the first gap 21 to support the rotor 20, prevents direct contact between the stator 18 and rotor 20 and provides an electric motor module 12 which is robust to shock and vibration loading due to the presence of the lubricant 22.

Figure 3:
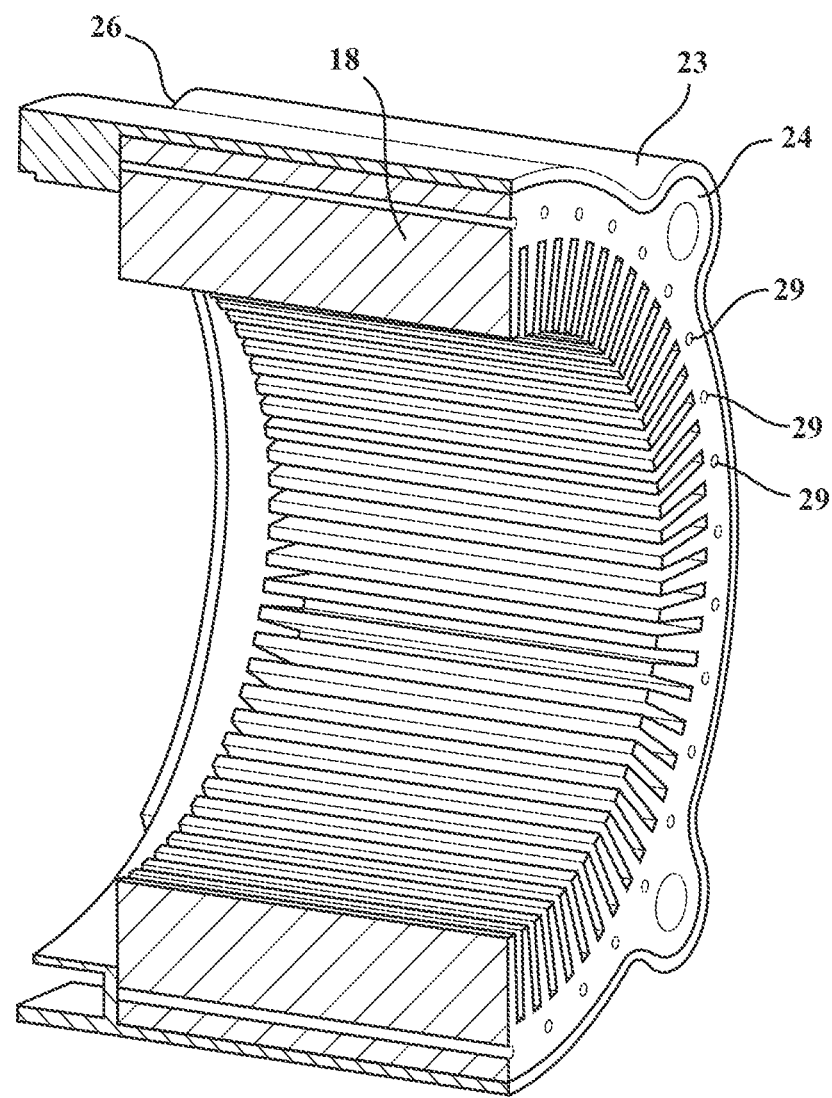
FIG. 3 is a perspective cross-sectional view of a stator of the electric motor module press-fit into a surrounding motor support housing.

The electric motor module 12 includes a motor support housing 23 extending along the axis A from a first motor housing end 24 to a second motor housing end 26 and which is disposed in surrounding relationship with the stator 18 and rotor 20 for housing and isolating the motor components from an environment of the lubricant supported electric motor assembly 10. As best illustrated in FIG. 3, in an arrangement, the stator 18 can be press-fit into the motor support housing 22. However, other means of arranging the motor support housing 23 around the stator 18 and rotor 20 can be utilized without departing from the scope of the subject disclosure.

Figure 5:
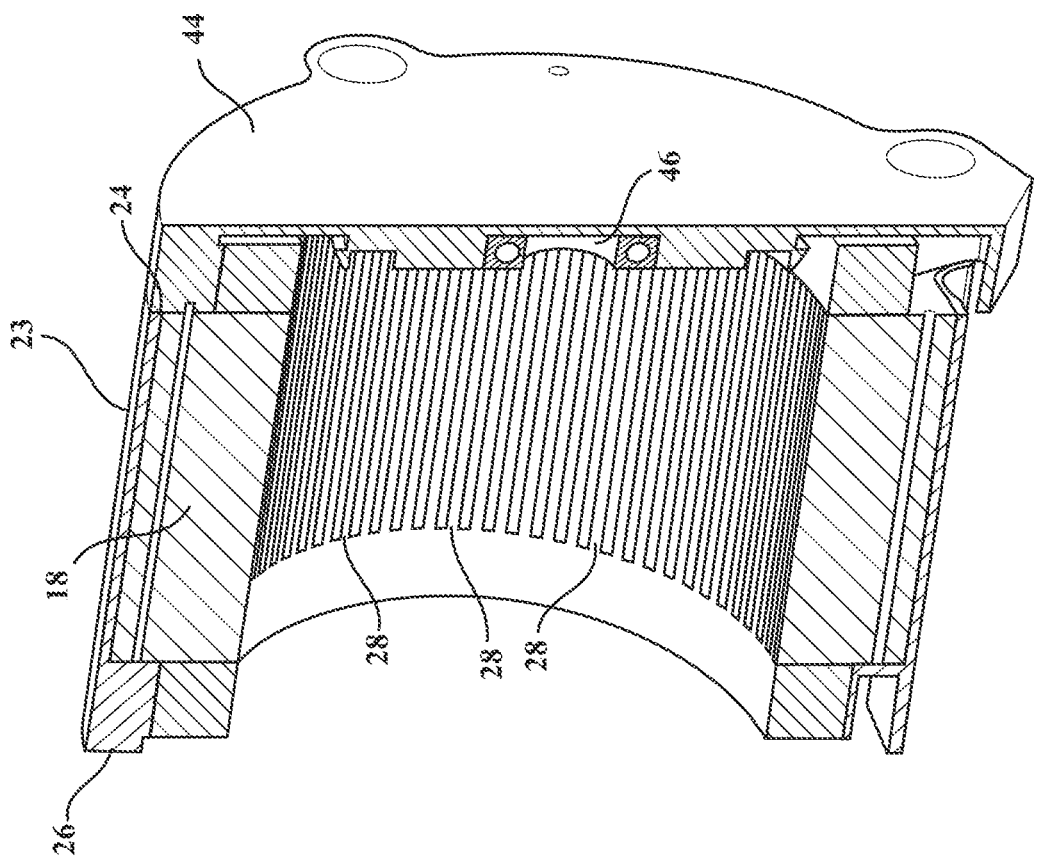
FIG. 5 is a cross-sectional perspective view of the stator illustrating a motor housing cover attached to a first housing end of the motor support housing.
Figure 4:
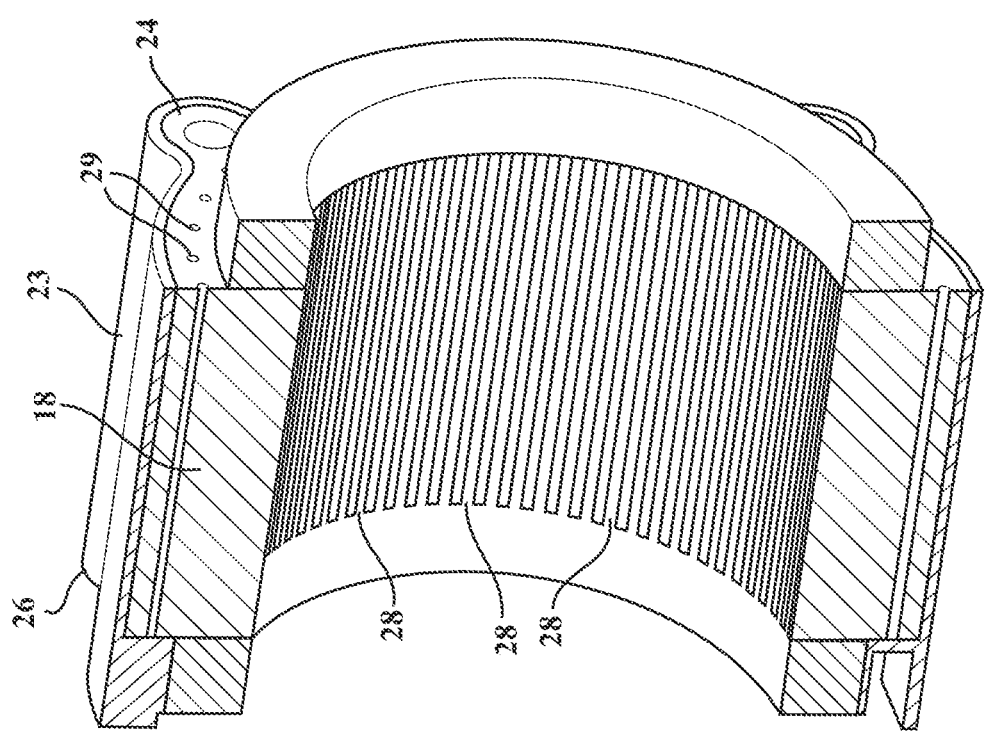
FIG. 4 is a cross-sectional perspective view of the stator illustrating a plurality of windings passing through the stator and a plurality of cooling passages disposed circumferentially along an outer portion of the stator.

As best illustrated in FIGS. 3-5, the stator 18 is comprised of a stack of stator laminations which receive copper windings 28 passing therethrough. As further illustrated in FIGS. 3-4, the stator 18 defines a plurality of cooling passages 29 extending axially through the stator 18 in circumferentially spaced relationship with one another. The plurality of cooling passages 29 are disposed in fluid communication with a lubricant supply, such as the same lubricant supply which communicates to the first gap 21 between the stator 18 and rotor 20, for conducting lubricant/oil through the stator lamination stack and conducting heat away from, and thus cooling, the stator 18. As will be described in more detail below, a lubricant/oil distribution manifold with a variable cross section can be utilized to supply an equal flow of lubricant to all of the plurality of cooling passages 29. A similar circular manifold can also be used to conduct the lubricant away from the stator 18 to a lubricant return system (not expressly shown). These manifolds may be part of the overall motor support structure and may also serve to conduct lubricant to bearings, gears or hydraulic actuators of the lubricant supported electric motor assembly 10.

Figure 6:
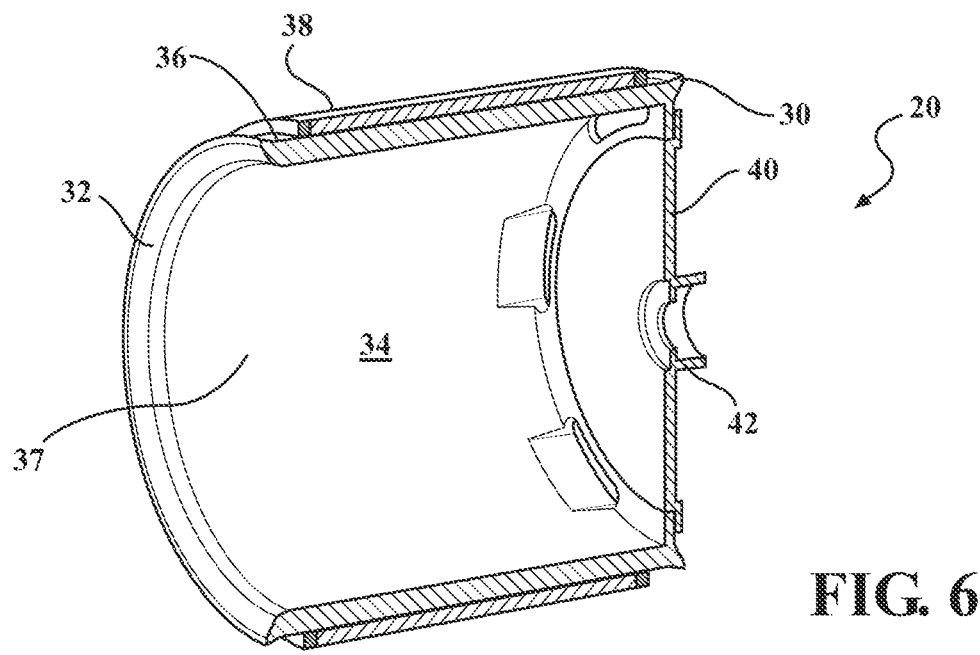
FIG. 6 is a cross-sectional perspective view of a rotor of the electric motor module illustrating a rotor plate and magnets secured to the rotor.
Figure 7:
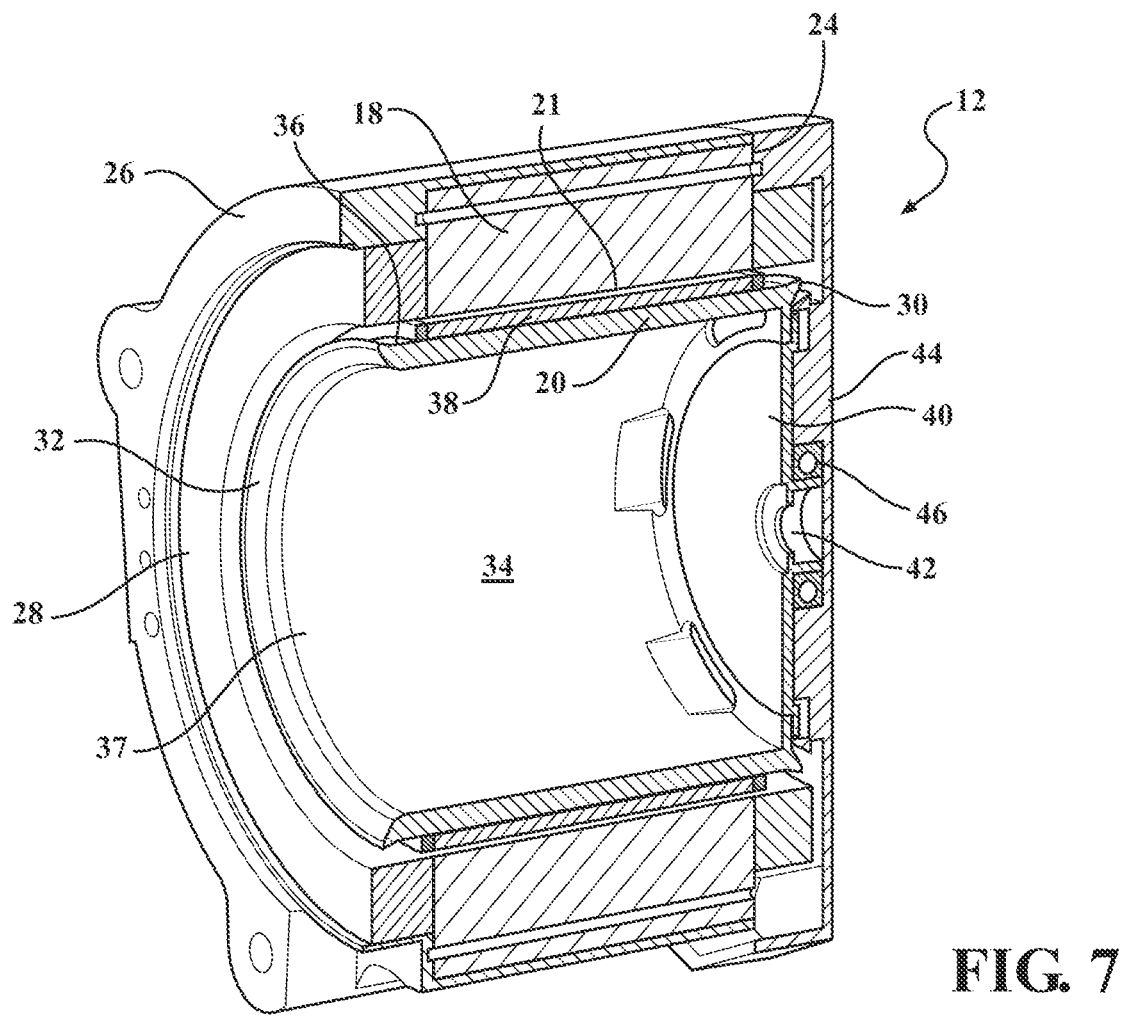
FIG. 7 is a cross-sectional perspective view of the electric module in an assembled condition.

As best illustrated in FIG. 6, the rotor 20 of the electric motor module 12 extends between a first rotor end 30 and a second rotor end 32, and is preferably cylindrical shaped to present a outer rotor surface 36 and an inner rotor surface 37, each of which extend in generally parallel and radially spaced relationship to the axis A. As best illustrated in FIGS. 2 and 6-7, the inner rotor surface 37 of the rotor 20 defines an internal rotor cavity 34. A series of magnets 38 extend circumferentially around the outer rotor surface 36 and are disposed in adjacent and facing relationship with the stator 18. The magnets 38 can be glued to the outer rotor surface 36 or otherwise secured to the outer rotor surface 36 using mounting magnet retainers, or the like. As best illustrated in FIGS. 1-2 and 6-7, a rotor plate 40 being generally circular in shape is secured to the first rotor end 30 of the rotor 20 to enclose the internal rotor cavity 34 at the first motor housing end 24. The rotor plate 40 includes a spindle 42 extending axially away from the internal rotor cavity 34 in aligned relationship about the axis A. The rotor 20 is preferably comprised of a very thin structure, and thus when the rotor plate 40 is secured to the first rotor end 30, the resulting rotor structure 20 resembles a small paint can in both size and shape. As best illustrated in FIGS. 1-2 and 7, a motor housing cover 44 is secured to the first housing end 24 of the motor support housing 23 and is disposed adjacent the first rotor end 30 of the rotor 20 as well as the rotor plate 40. The motor housing cover 44 includes a motor bearing 46 disposed in aligned relationship with the axis A for receiving the spindle 42 of the rotor plate 46 and mechanically rotatably supporting the rotor 20 relative to the motor housing cover 44. In a preferred arrangement, the motor bearing 46 includes rolling elements or plain wheel bearing support, however other bearings could be utilized without departing from the scope of the subject disclosure. As will be described in more detail immediately below, the spindle 42 of the rotor plate 40 in combination with the motor bearing 46 facilitates an operable connection between the electric motor module 12 and the shifting and first stage module 14, which are sequentially operably connected to one another. This operable connection may be stiff in torsion and radial displacement or may have defined compliances in torsion and radial displacement, the compliances of which may help control NVH or other vibration problems for the lubricant supported electric motor assembly 10.

In an embodiment, the motor support housing 22 of the electric motor module 12 may also house mounting locations and wiring channels for the motor's sensors. These include, but are not limited to, motor winding temperature, motor coolant temperature, motor angular position, system vibration level, shift actuator position and hydraulic system pressure(s).

Figure 8:
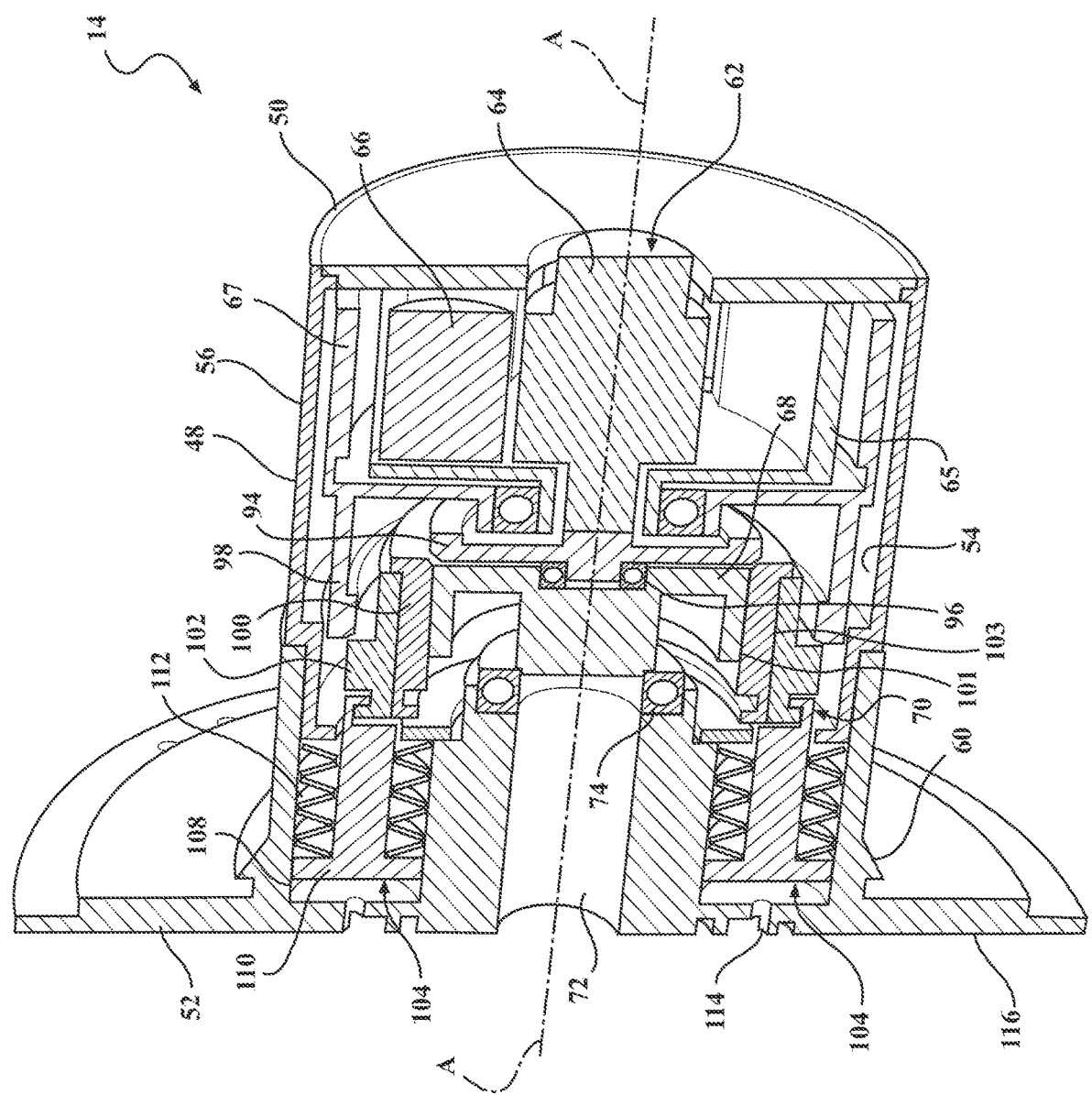
FIG. 8 is a cross-sectional perspective view of the shifting and first stage module.
Figure 9:
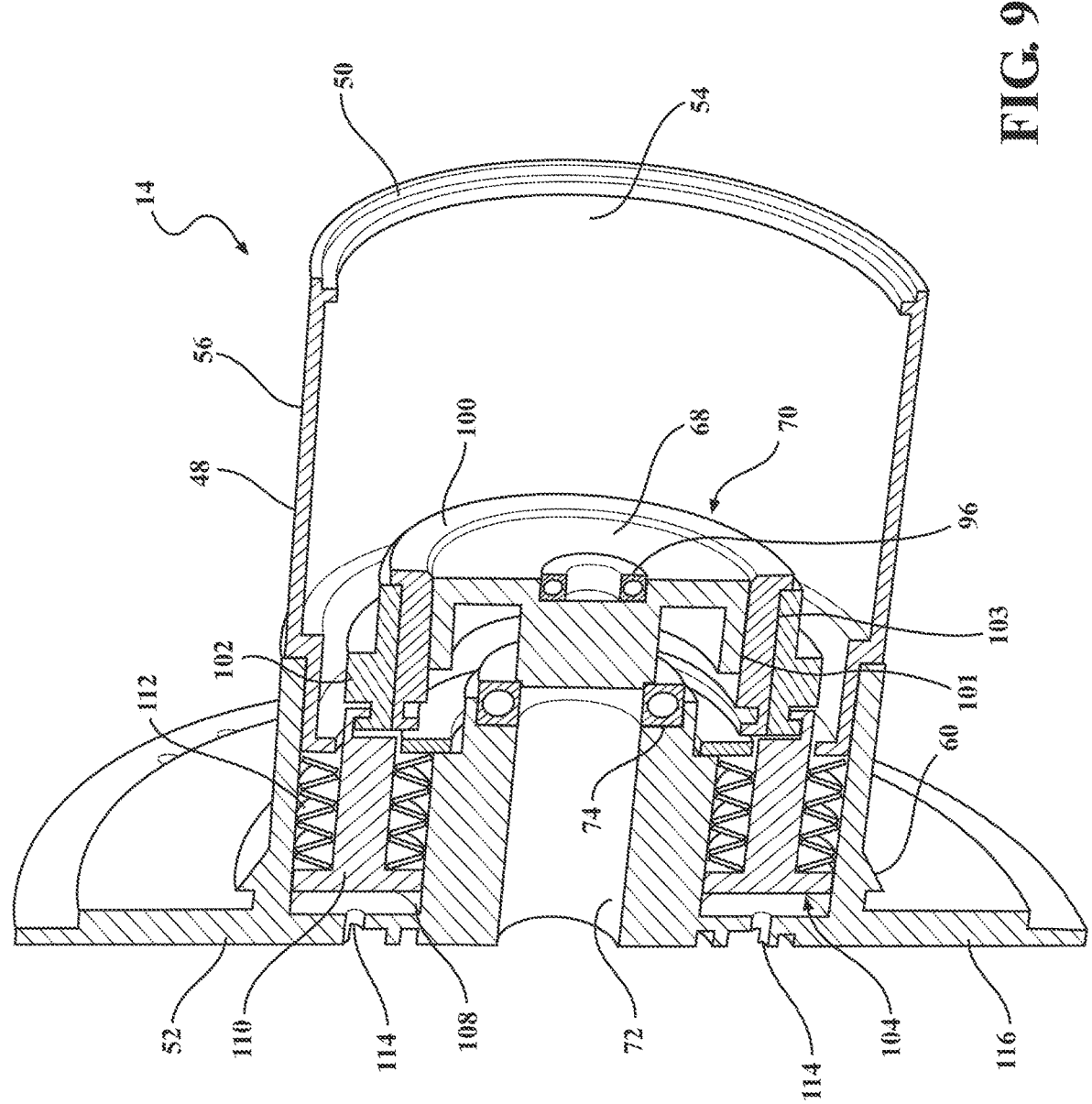
FIG. 9 is a cross-sectional perspective view of a portion of the shifting and first stage module illustrating a plurality of actuators and a shifting mechanism comprised of a low speed slider clutch and a high speed slider clutch concentrically arranged about an output gear.
Figure 11:
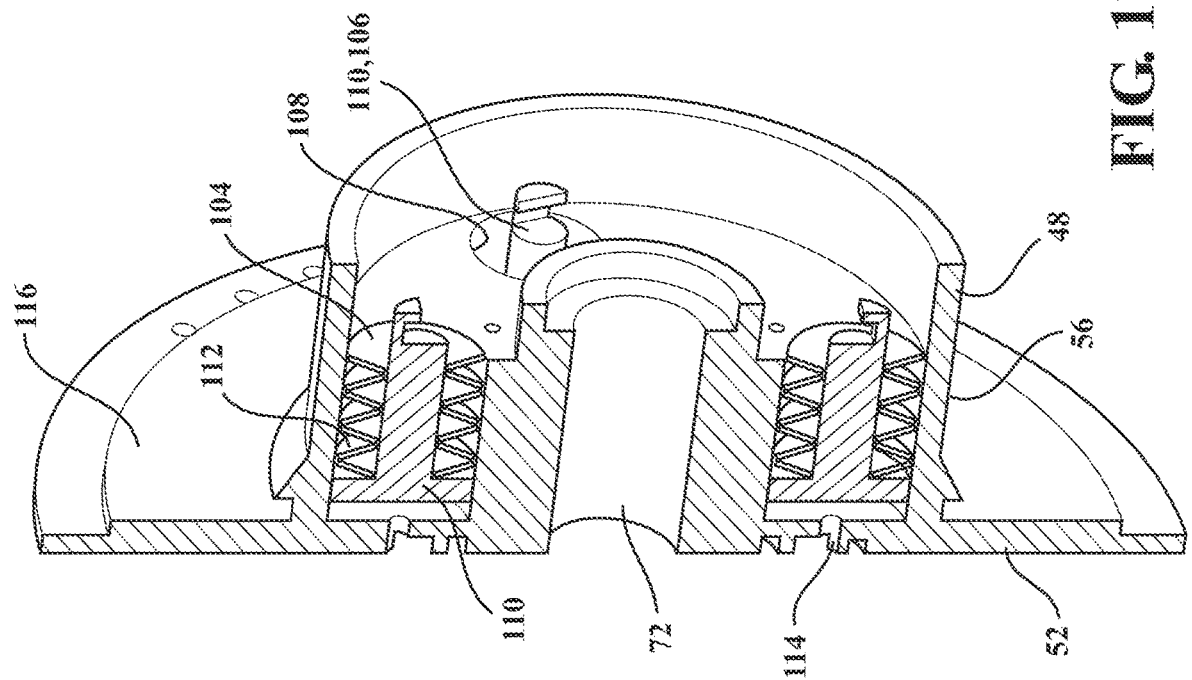
FIG. 11 is a cross-sectional view of a portion of the shifting and first stage module illustrated in FIG. 8 illustrating the plurality of actuators including a biasing member biased against the piston.

As best illustrated in FIG. 1, the shifting and first stage module 14 is assembled into and disposed within the internal rotor cavity 34 and includes a first planetary gear reducer assembly 62 operably connected with the rotor 20 for rotation therewith. As best illustrated in FIGS. 8-9, the shifting and first stage module 14 includes a gear housing 48 extending from a first gear housing end 50 to a second gear housing end 52 to define an internal gear cavity 54 and present a radially outer gear housing surface 56 extending between the first and second gear housing ends 52, 54. As best illustrated in FIG. 1, the gear housing 48 is inserted into and placed inside of the internal rotor cavity 34 to dispose the first gear housing end 50 in adjacent relationship with the rotor plate 46 as well as the first rotor end 30 and the second gear housing end 52 in abutting and secured relationship with the second housing end 26 of the motor support housing 22. The second gear housing end 52 of the shifting and first stage module 14 encloses an open portion of the internal motor cavity 34 of the electric motor module 12 disposed adjacent the second housing end 26 of the motor support housing 22, to result in a structure comprised of both the electric motor module 12 and the shifting and first stage module 14.

Additionally, as best illustrated in FIG. 1, in this nested or combined relationship, the outer gear housing surface 56 extends along an inner rotor surface 37 of the rotor 20 and presents a second lubricant bearing surface/structure for rotatably supporting the rotor 20 relative to the stator 18. Put another way, the outer gear housing 56 is disposed in slightly spaced relationship with the inner rotor surface 37 of the rotor 20 to define a second gap 58 and the lubricant 22 is also disposed in and pressurized within this second gap 58 to provide auxiliary or additional lubricant support of the rotor 20 relative to the stator 18. As illustrated in FIG. 1, this second gap 58 can taper radially outward from the second gear housing end 52 to the first gear housing end 50 such that during operation this taper pushes the lubricant 22 towards the right portion of the modules 12, 14 (i.e., towards the first motor housing end 24 and the first gear housing end 50) and into various lubricant cavities defined by the motor support housing 22. Further, the gear housing 48 defines an annular shoulder 60 extending radially outwardly form the outer gear housing surface 56 adjacent the second gear housing end 52, and which is disposed in abutting relationship with the second rotor end 32 of the rotor 18 for ensuring correct axial placement of the first planetary gear reducer assembly 62 and the rotor 20 relative to one another and preventing lubricant from escaping the second gap 58 adjacent this rotor 20/shoulder 60 interface.

As best illustrated in FIGS. 1 and 8, the first planetary gear reducer assembly 62 is disposed inside of the internal gear cavity 54 adjacent the first gear housing end 50, and is operably interconnected to the rotor plate 46 for being driven in response to rotation of the rotor plate 46 about the axis A by the rotor 20, thus establishing the operable connection between the first planetary gear reducer assembly 62 and the rotor 20. In an arrangement, the first planetary gear reducer assembly 62 is sun driven and includes a first sun gear 64 rotatably aligned along the axis A in abutting and operably interconnected relationship with the rotor plate 46, preferably in opposing relationship with the spindle 42. As further illustrated in FIGS. 8 and 17, the first planetary gear reducer assembly 62 includes a first planet carrier 65 rotatably supporting a plurality of first planet gears 66 arranged radially outwardly of and operably connected to the first sun gear 64, and a first ring gear 67 is arranged concentrically around and operably connected to the first planet gears 66 for rotation about the axis A in response to rotation of the first sun gear 64. Although described as being sun driven, the first planetary gear reducer assembly 62 could also be planet carrier driven without departing from the scope of the subject disclosure. Support for components of the first planetary gear reducer assembly 62 may be provided by self-centering gears, rolling element bearings (as shown) or plain bearings.

As further illustrated in FIGS. 1, 8-9 and 14, the shifting and first stage module 14 also includes an output gear 68 rotatably aligned along the axis A and disposed adjacent the first sun gear 64. Similar to the planetary gear components, support for the output gear 68 may be provided by self-centering gears, rolling element bearings (as shown) or plain bearings. As will be described in more detail immediately below, the shifting and first stage module 14 includes a shifting mechanism 70 for selectively coupling the output gear 68 with the first planetary gear reducer assembly 62 and establishing selective rotation therewith. As will be described in more detail below, the shifting mechanism 70 effectuates the transferring of adjustable torque to the final drive module 16 (which as described previously is operably connected sequentially or downstream from the shifting and first stage module 14). As further illustrated in FIGS. 1, 8-9 and 14, the gear housing 48 defines a output shaft channel 72 extending along the axis A from the second gear housing end 52 to the output gear 68. The gear housing 48 also houses or supports a output shaft bearing 74 disposed radially outside of the output shaft channel 72 next adjacent the output gear 68. The output shaft channel 72 and the output shaft bearing 74 receive and rotatably support an output shaft 76 (See e.g., FIGS. 1 and 14) that is operably connected to the output gear 68 and extends along the axis A from the output gear 68 and axially out of or away from the second gear housing end 52 of the gear housing 48 for ultimately establishing the operable connection between the shifting and first stage module 14 to the final drive module 16.

Figure 19:
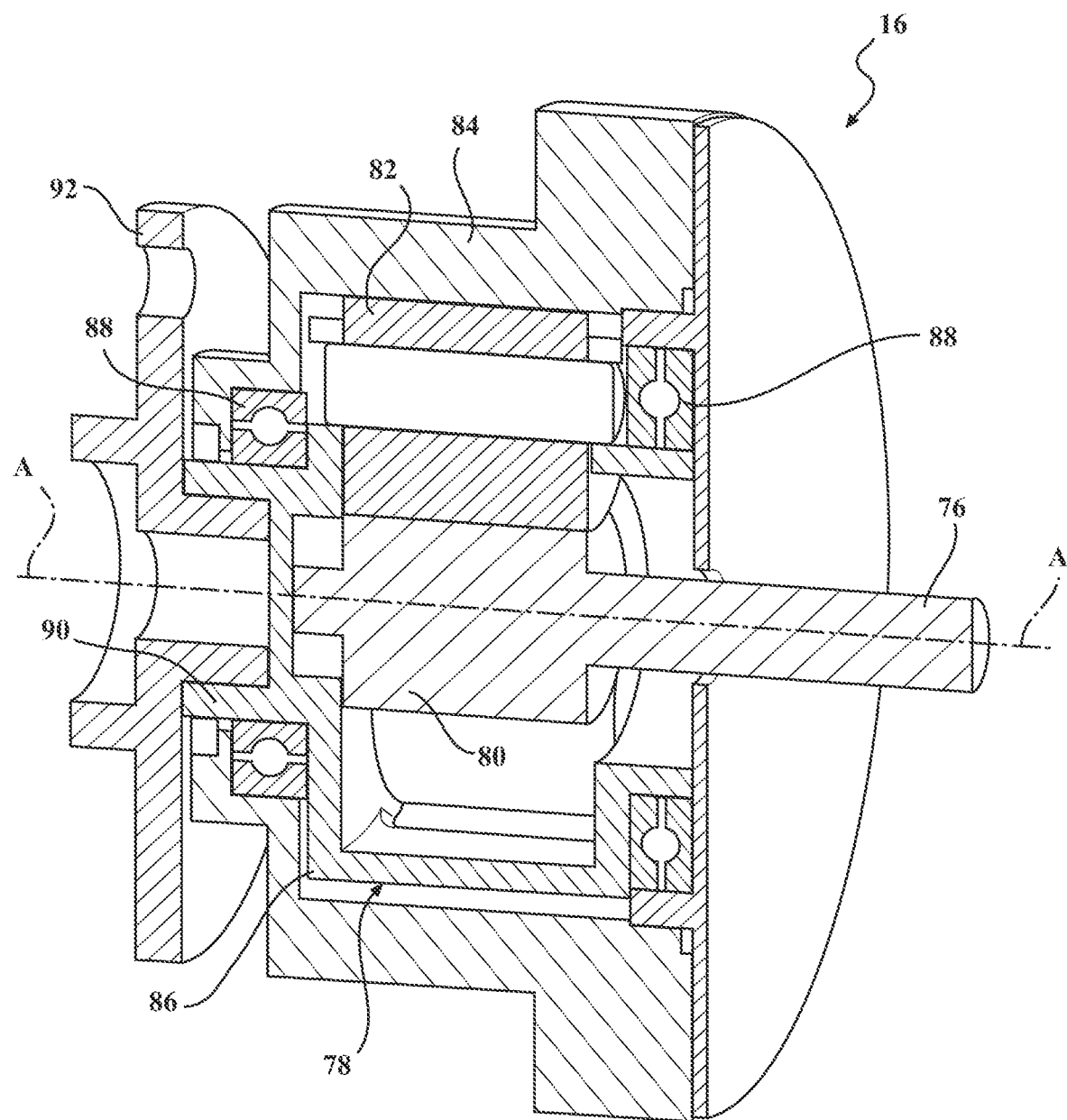
FIG. 19 is a perspective cross-sectional view of the final drive module illustrating a second planetary gear reducer assembly.
Figure 20:
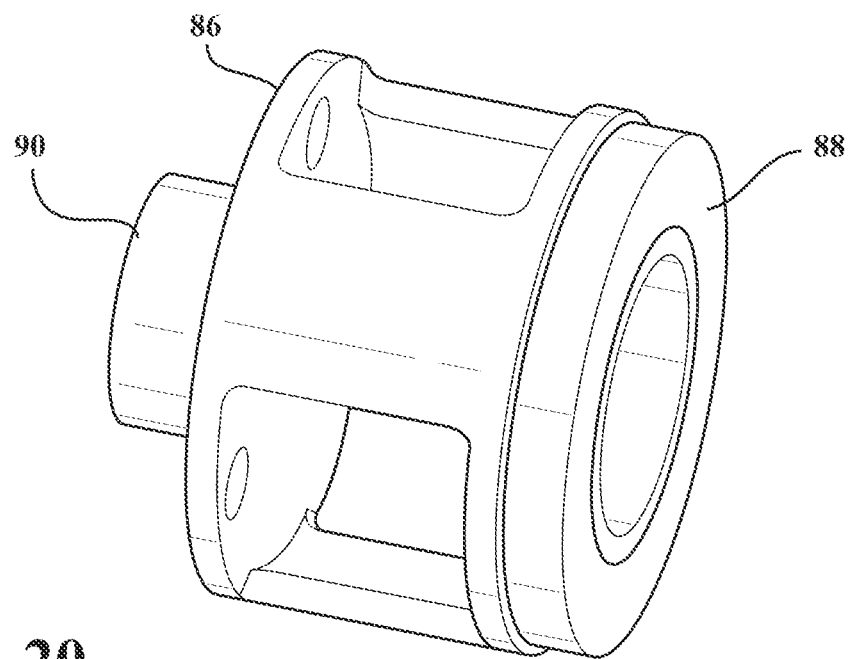
FIG. 20 is a perspective cross-sectional view of a planet carrier and wheel bearing of the second planetary gear reducer assembly.
Figure 21:
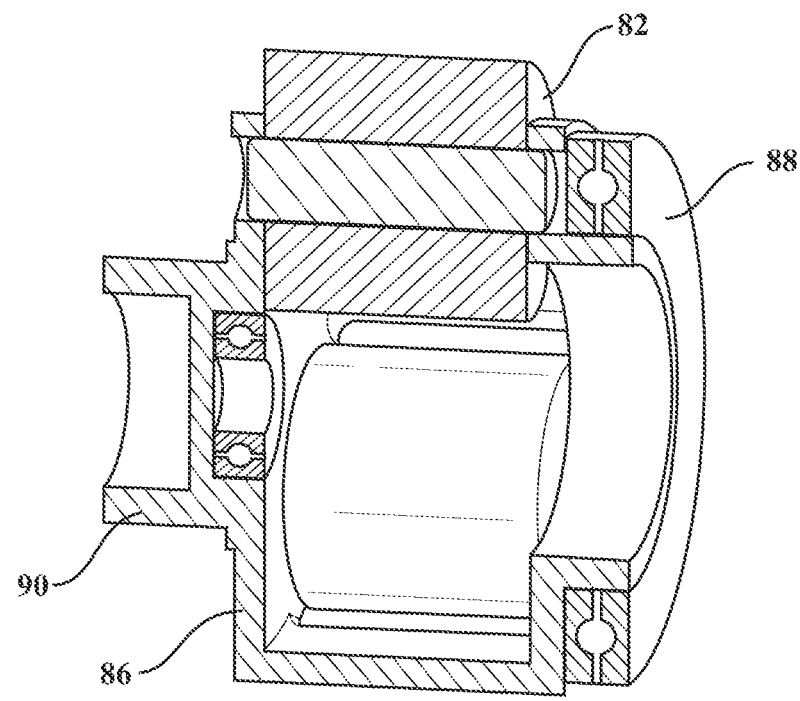
FIG. 21 is a perspective cross-sectional view of second planet gears of the second planetary gear reducer assembly.
Figure 22:
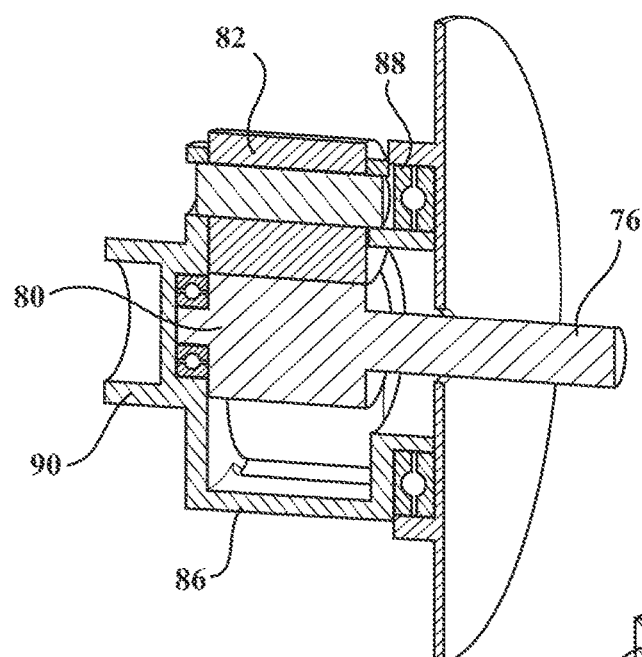
FIG. 22 is a perspective cross-sectional view illustrating a second sun gear, drive shaft and cover of the final drive module.
Figure 23:
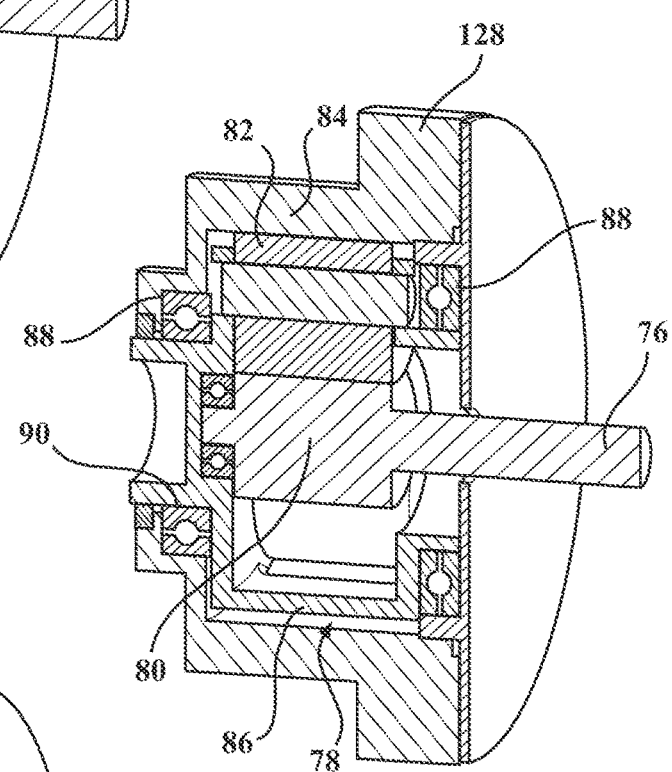
FIG. 23 is a perspective cross-sectional view illustrating the final drive module in an assembled condition.
Figure 24:
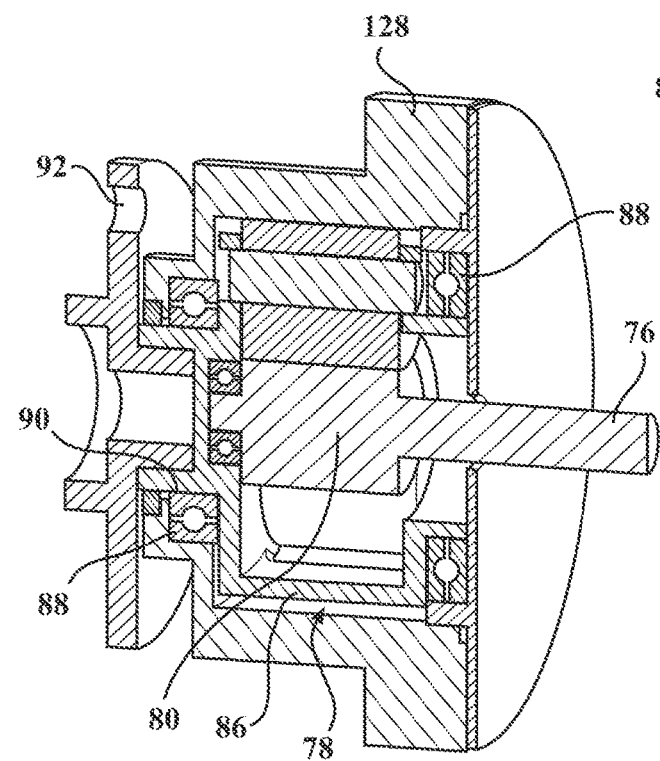
FIG. 24 is a perspective cross-sectional view of the final drive module illustrating a wheel flange operably interconnected to the planet carrier.
Figure 25:
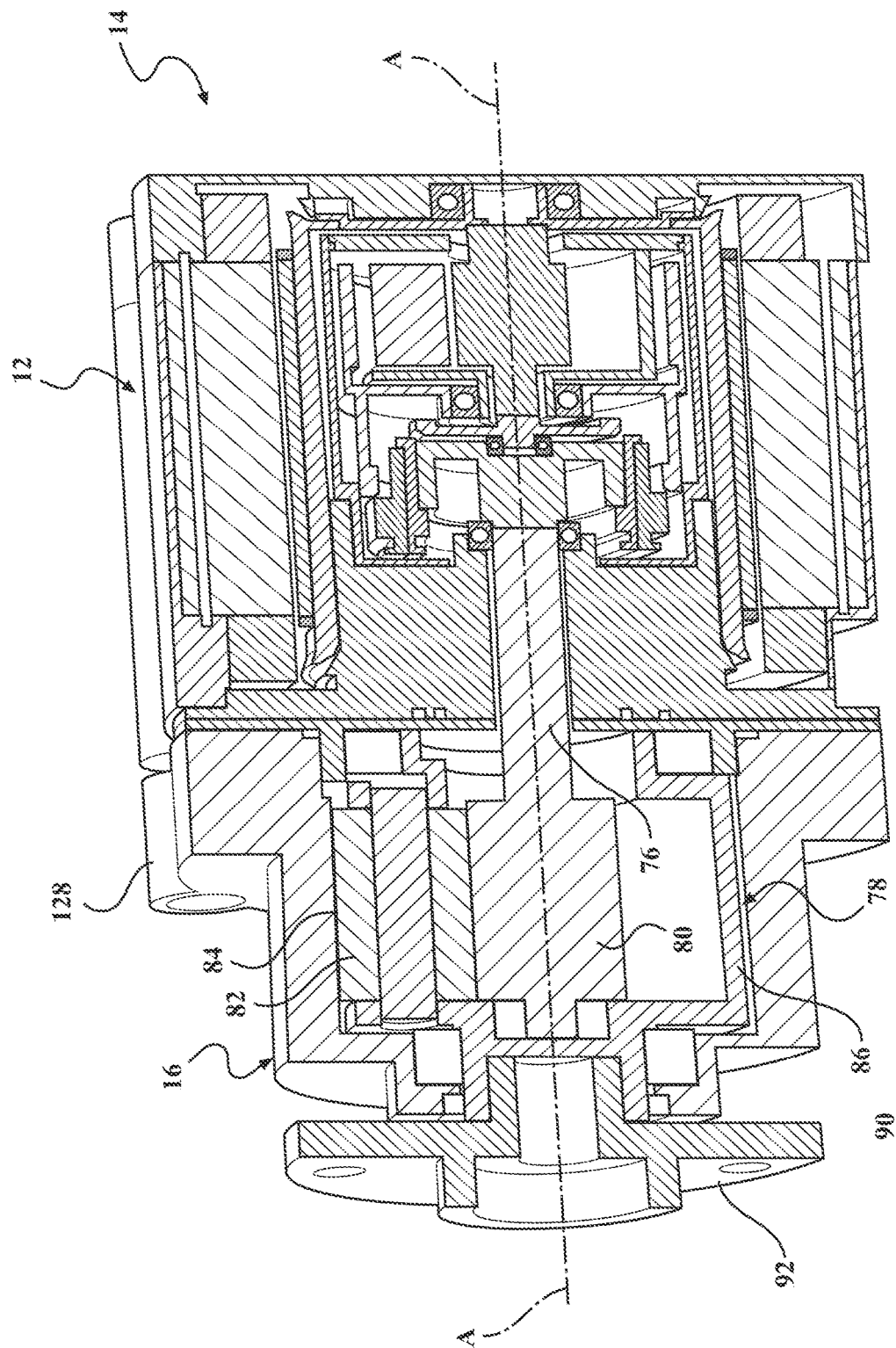
FIG. 25 is a perspective cross-sectional view of the lubricant supported electric motor assembly illustrating an alternative arrangement of the final drive module.

As best illustrated in FIG. 1, the final drive module 16 is disposed adjacent the second gear housing end 52 of the shifting and first stage module 14 as well as the second motor housing end 26 of the electric motor module 12, and includes a second planetary gear reducer assembly 78 operably coupled with the output gear 68. As will be described in more detail below, the second planetary gear reducer assembly 78 of the final drive module 16 transfers torque received from the shifting and first stage module 14 to a wheel of the vehicle. As best illustrated in FIGS. 1 and 19, the second planetary gear reducer assembly 78 includes a second sun gear 80 rotatably aligned along the axis A in operably interconnected relationship with the output shaft 76 for rotatably coupling the second sun gear 80 with the output gear 68 of the shifting and first stage module 14 and establishing the operable connection therewith. As further illustrated in FIGS. 1 and 19-23, the second planetary gear reducer assembly 78 also includes a plurality of second planet gears 82 arranged radially outwardly of and operably connected to the second sun gear 80, and a second ring gear 84 is arranged concentrically around and operably connected to the second planet gears 82. A planet carrier 86 rotatably supports the second planet gears 82 and is rotatable about the axis A in response to rotation of the second sun gear 80. Support for components of the second planetary gear reducer assembly 78 is provided by a plurality of wheel bearings 88, but may be provide by other types of bearings without departing from the scope of the subject disclosure. As further illustrated in FIGS. 1 and 19-24, the planet carrier 86 includes a wheel flange shaft 90 extending along the axis A, and a wheel flange 92 is coupled to the wheel flange shaft 90 for rotation commensurate with rotation of the planet carrier 86. The wheel flange 92 ultimately is coupled with a wheel hub for transferring torque directly from the final drive module 16 to the vehicle's wheel. Put another way, the wheel flange shaft 90 and the wheel flange 92 establish a direct coupling of the lubricant supported electric motor assembly 10 to a wheel of a vehicle to place the lubricant supported electric motor assembly 10 in an in-wheel or on-wheel arrangement.

As previously mentioned, the shifting and first stage module 14 includes a shifting mechanism 70 for selectively coupling the output gear 68 with the first planetary gear reducer assembly 62 and transferring adjustable torque to the final drive module 16. In a preferred arrangement, this shifting mechanism 70 includes at least one slider clutch 100, 102 which is rotatable with and axially slideable relative to the output gear 68 from a neutral position wherein the at least slider clutch 100, 102 is disposed in spaced and non-engaged relationship with the first planetary gear reducer assembly 62 to an engaged position wherein the at least one slider clutch 100, 102 is moved axially towards and into selectively coupled relationship with said first planetary gear reducer assembly 62 to establish the selective coupling between said first planetary gear reducer assembly 62 and the output gear 68. Although the shifting mechanism 70 will be described in relation to a slider clutch, the shifting mechanism 70 could also take a number of different forms, such alternatively wet or dry plate clutches, conical synchronizers, or the like, to achieve the plurality of different functions (such as the high gear condition/function illustrated in FIG. 15A, the low gear condition/function illustrated in FIG. 15B, the neutral condition/function illustrated in FIG. 15C, and the park condition/function illustrated in FIG. 15D) for the lubricant supported electric motor assembly 10. Each of these functions will be explained below in association with a more detailed description of the slider clutches in the preferred embodiment of the shifting mechanism 70.

As best illustrated in FIGS. 1 and 8, the first sun gear 64 of the first planetary gear reducer assembly 62 includes an annular sun gear flange 94 extending radially from the first sun gear 64 and disposed adjacent the output gear 68. The sun gear flange 94 is rotatable in conjunction with the first sun gear 64, and supported by a flange bearing 96 presented on the output gear 68 and aligned about the axis A. As further illustrated in FIGS. 1 and 8, the first ring gear 67 includes a concentric ring gear flange 98 extending axially from the first ring gear 67 towards the second gear housing end 52 in concentric and radially spaced relationship with the axis A. Similar to the sun gear flange 94, the ring gear flange 98 is also rotatable about the axis A in conjunction with the first ring gear 67.

The shifting mechanism 70 preferably includes a plurality of slider clutches 100, 102 for establishing the multiple functions (i.e., high gear, low gear, park and neutral) of the lubricant supported electric motor assembly 10. In this preferred arrangement, and as best illustrated in FIGS. 1, 8-9 and 14, the plurality of slider clutches 100, 102 of the shifting mechanism 70 includes a high speed slider clutch 100 and a low speed slider clutch 102 concentrically and slideably arranged relative to one another, and collectively secured to the output gear 68 for rotation therewith. More specifically, the high speed slider clutch 100 is concentrically and slideably received along an outer sliding gear surface 101 of the output gear 68 for axially sliding from the neutral position (as shown in FIG. 15C, and in which no rotational torque is transferred from the first planetary gear reducer assembly 62 to the output gear 68) to the respective engaged position (as shown in FIG. 15A). The low speed slider clutch 102 is also concentrically and slideably received along an outer sliding clutch surface 103 of the high speed slider clutch 100 for axially sliding from the neutral position (as shown in FIG. 15C) to the respective engaged position (as shown in FIG. 15B). To accomplish this arrangement, each of the low and high speed slider clutches 100, 102 are cylindrical or sleeve shaped, with the low speed slider clutch 102 having a larger diameter than a smaller diameter of the high speed slider clutch 100. As will be described in more detail below, each of the high and low speed slider clutches 100, 102 are individually actuatable to establish selective coupling between the output gear 68 and the first planetary gear assembly 62 and transfer adjustable torque from the shifting and first stage module 14 to the final drive module 16. For example, (1) in one instance the low and high speed slider clutches 100, 102 slide in unison relative to the output gear 68 towards the first gear housing end 50 (See FIG. 15D), (2) in another instance only the high speed slider clutch 100 slides along the outer sliding gear surface 101 of the output gear 68 towards the first gear housing end 50, while the low speed slider clutch 102 remains in a non-actuated position (See FIG. 15A) or (3) in yet another instance only the low speed slider clutch 102 slides along the outer sliding clutch surface 103 of the high speed slider clutch 100, while the high speed slider clutch 100 remains in a non-actuated position (See FIG. 15B). After actuation, the high and low speed slider clutches 100, 102 retract towards the second gear housing end 52, sliding along their respective sliding surfaces 101, 103 to return to the neutral, non-actuated position (as shown in FIG. 15C).

More specifically, FIGS. 1, 8 and 15C illustrate an arrangement in which both the high and low speed slider clutches 100, 102 are disposed in their neutral, non-actuated positions, and thus each are disposed in spaced and non-engaging relationship with the sun gear flange 94 and the ring gear flange 98. In this neutral, non-actuated position for both of the low and high speed slider clutches 100, 102, an operable connection is not present between the first planetary gear reducer assembly 62 and the output gear 68, and thus no torque is transferred between these components. As such, the high and low speed slider clutches 100, 102 achieve the neutral function for the lubricant supported electric motor assembly 10 in this position, namely because there is no connection between the first planetary gear reducer assembly 62 and the second planetary gear reducer assembly 78.

As best illustrated in FIG. 15A, when only the high speed slider clutch 100 is actuated and slides along the outer sliding gear surface 101 of the output gear 68 from the neutral position (shown in FIG. 15C) to its respective engaged position (shown in FIG. 15A), the high speed slider clutch 100 moves into overlaying and operably interconnected relationship with the sun gear flange 94, such that rotation of the first sun gear 64 drives corresponding rotation of the high speed slider clutch 100 as well as the output gear 68 to which the high speed slider clutch 100 is operably connected. In this arrangement, the high speed slider clutch 100 establishes a high gear for the lubricant supported electric motor assembly 10, namely because the second stage gear reducer assembly 78 is operably connected to the first sun gear 64.

As best illustrated in FIG. 15B, when the high speed slider clutch 100 is retracted to the neutral position, and only the low speed slider clutch 102 is actuated to axially slide from the neutral position (shown in FIG. 15C) to its respective engaged position (as in FIG. 15B), the low speed slider clutch 102 moves into abutting and operably interconnected relationship with the ring gear flange 98. As a result, rotation of the first ring gear 67 drives corresponding rotation of the low speed slider clutch 102 as well as the output gear 68 to which the low speed slider clutch 102 is operably connected via the high speed slider clutch 100 (i.e., because the output gear 68, the high speed slider clutch 100, and the low speed slider clutch 102 are concentrically arranged on another to simultaneously rotate in unison about the axis A). In this arrangement, the low speed slider clutch 102 establishes a low gear for the lubricant supported electric motor, namely because the secondary gear reducer assembly 78 is operably connected to the first stage ring gear 98.

As best illustrated in FIG. 15D, when both the low and high speed slider clutches 100, 102 are actuated and moved into respective engaged conditions and respectively into operable connection with the ring gear flange 98 and the sun gear flange 94, this establishes an operable connection of the second planetary gear reducer assembly 78 to both the first stage ring gear 98 as well as the first stage sun gear 64, which locks the output gear 68 due to the action of the first stage planet gears 66. In other words, actuating both the low and high speed slider clutches 100, 102 creates a locked condition for the lubricant supported electric motor assembly 10, because the first stage ring and sun gears 64, 68 are locked up, to establish the park gear function.

As best illustrated in FIGS. 1 and 8-15, the shifting and first stage module 14 includes a plurality of actuators 104, 106 arranged about the second gear housing end 52 of the gear housing 48 in circumferentially spaced relationship to one another for each actuating the low and high speed slider clutches 100, 102 in accordance with the operational principles described above. In a preferred arrangement, the plurality of actuators 104, 106 include at least one low speed actuator 104 operably connected to the low speed slider clutch 100 and at least one high speed actuator 106 operably connected to the high speed slider clutch 102. In a more preferred arrangement, the at least one low speed actuator 104 includes a pair of low speed actuators 104 disposed in diametrically opposed relationship to one another and each operably connected to the low speed slider clutch 100, and the at least one high speed actuator 106 includes a pair of high speed actuators 106 disposed in diametrically opposed relationship to one another and each operably connected to the high speed slider clutch 102. Arrangement of the pairs of low and high speed actuators 104, 106 in diametrically opposed relationship balances actuation of the respective slider clutch 100, 102 to achieve a balanced or even sliding movement—i.e., an actuation force is also applied to diametrically opposite portions of the respective slider clutch 100, 102 as opposed to an actuation force only applied in one location, resulting in more balanced movement of the clutches 100, 102.

Figure 10:
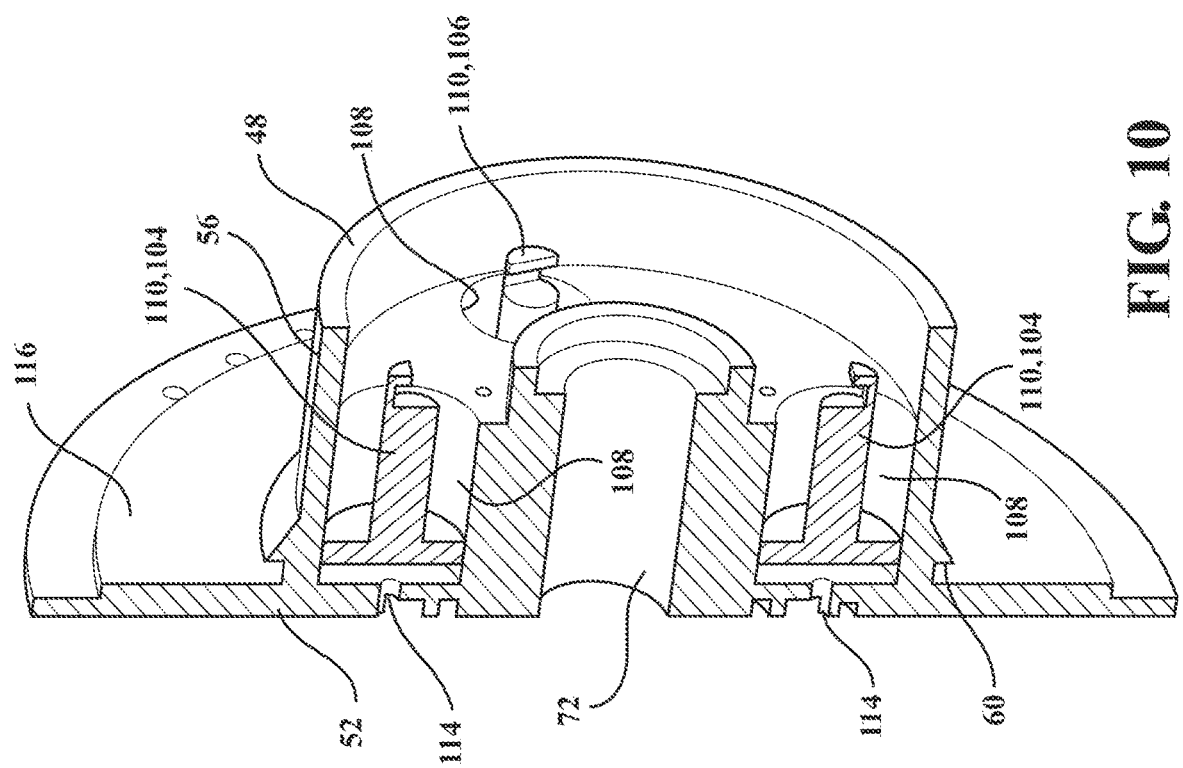
FIG. 10 is a cross-sectional view of a portion of a gear housing of the shifting and first stage module illustrating the plurality of actuators including pistons slidable disposed in actuator channels.
Figure 13:
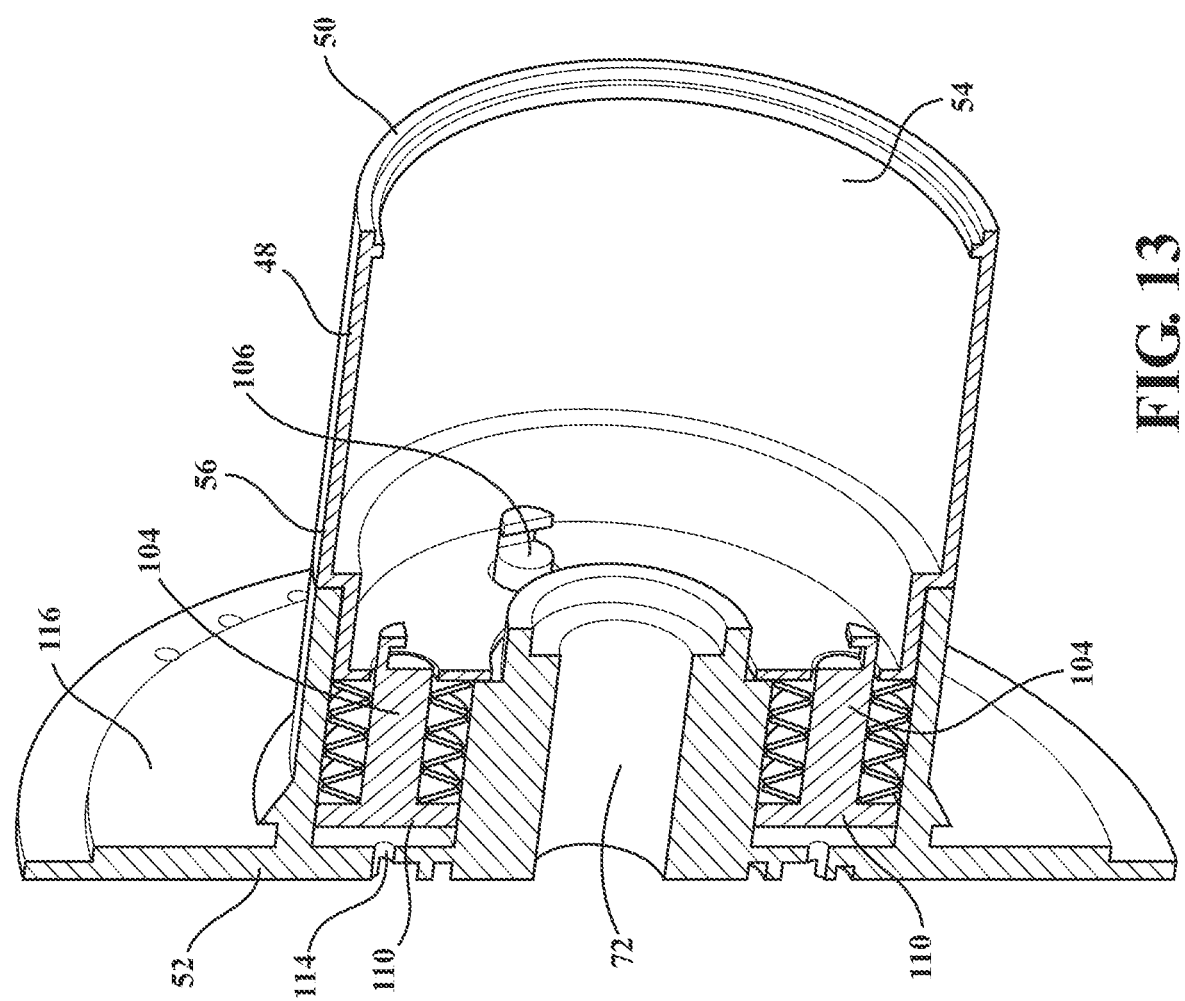
FIG. 13 is a cross-sectional perspective view of a portion of the shifting and first stage module illustrated in FIG. 8 illustrating an internal gear cavity.
Figure 16:
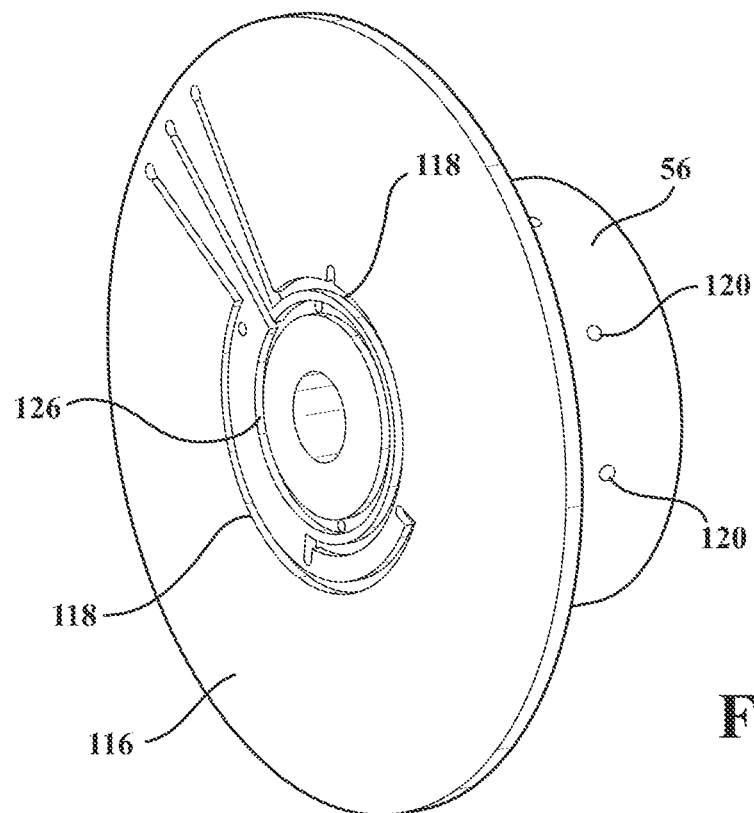
FIG. 16 is a perspective end view of a distribution plate manifold of the shifting and first stage module.
Figure 17:
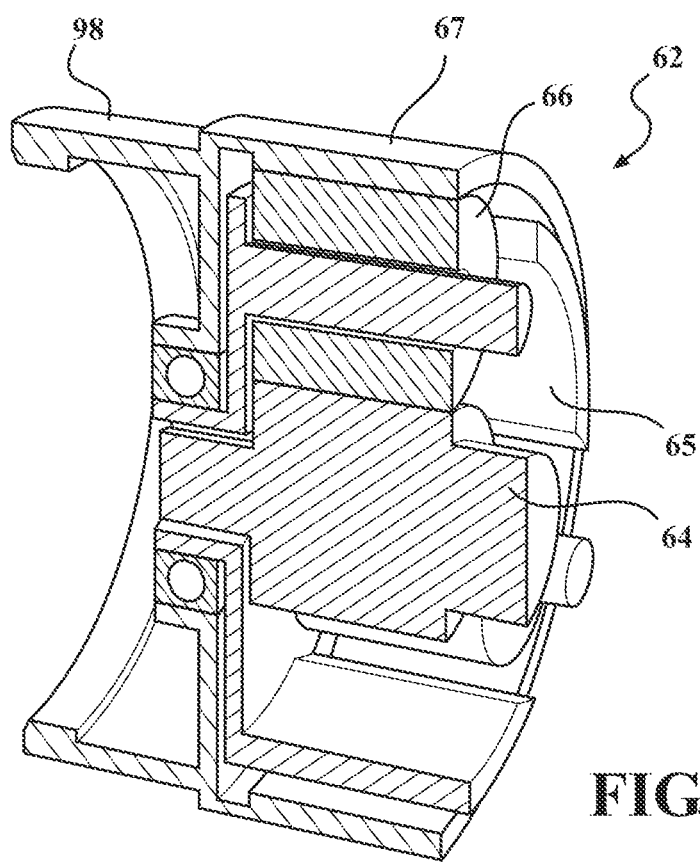
FIG. 17 is a perspective cross-sectional view of a first planetary gear reducer assembly of the shifting and first stage module.
Figure 18:
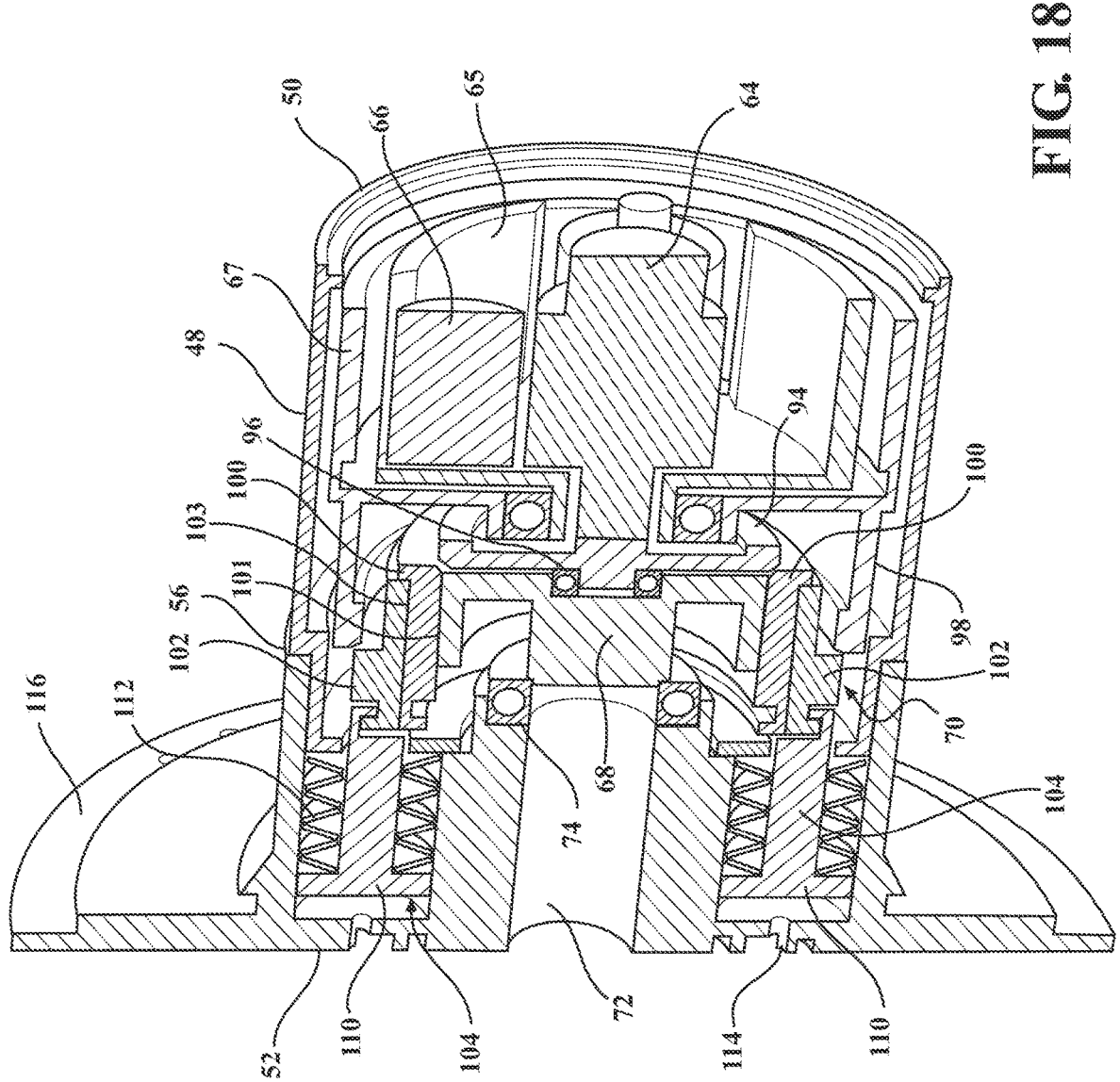
FIG. 18 is a perspective cross-sectional view of the shifting and first stage module illustrating the first planetary gear reducer assembly inserted into the internal gear cavity.

As best illustrated in FIG. 10, the second gear housing end 52 of the gear housing 48 defines a plurality of actuator channels 108 for receiving the at least one low and high speed actuator 104, 106. As further illustrated in FIGS. 1 and 8-14, each of the at least one low and high speed actuators 104, 106 are comprised of a piston 110 which is slideably received in the actuator channel 108, and a biasing member 112, such as a Belleville spring, or the like, for biasing the piston 110 towards the second gear housing end 52 and into their neutral positions. The second gear housing end 52 defines a plurality of fluid passageways 114 each disposed in fluid communication with a respective one of the actuator channels 108 for selectively delivering hydraulic fluid or lubricant, and the associated pressure, to the actuator channels 108 to overcome the bias of the biasing member 112 and drive the pistons 110 towards the first gear housing end 52 and the clutches 100, 102 into their respective engaged positions. Movement of the piston 110 associated with the at least one low speed actuator 100 results in actuation of the respective low speed slider clutch 100 and movement of the piston 110 associated with the at least one high speed actuator 102 results in actuation of the high speed slider clutch 102. When the pressure associated with the hydraulic fluid or lubricant is released from the actuator channels 108, the biasing member 112 moves the pistons 110 back towards the first gear housing end 50, which correspondingly pulls the respective low or high speed slider clutch 100, 102 back to its neutral position. As best illustrated in FIG. 16, the second gear housing end 52 includes an lubricant/oil distribution plate manifold 116 which defines a plurality of fluid channels 118 each disposed in fluid communication with a respective one of the fluid channels 118 for selectively delivering hydraulic fluid or lubricant 22 to the actuator channels 108 associated with the at least one low speed actuator 104 and/or the at least one high speed actuator 106.

Figure 12:
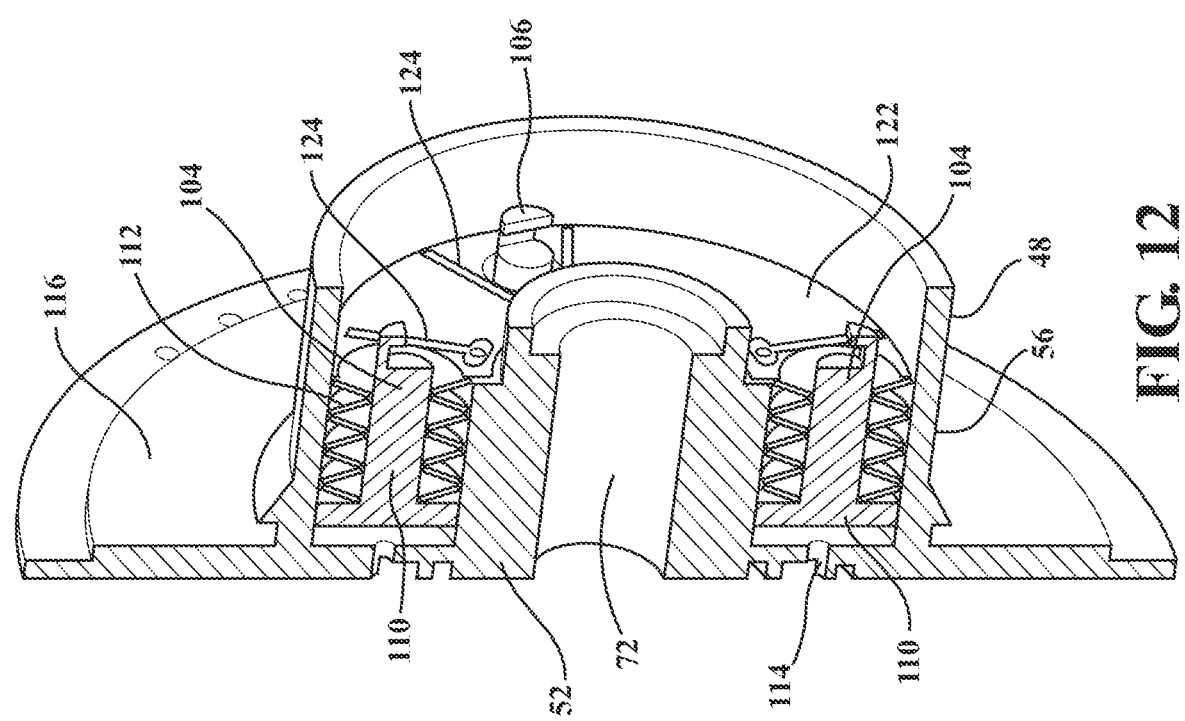
FIG. 12 is a cross-sectional view of a portion of the shifting and first stage module illustrated in FIG. 8 illustrating a restrictor plate defining restrictor channels for delivering lubricant to a second lubricant bearing surface/structure extending along an outer gear housing surface.
Figure 14:
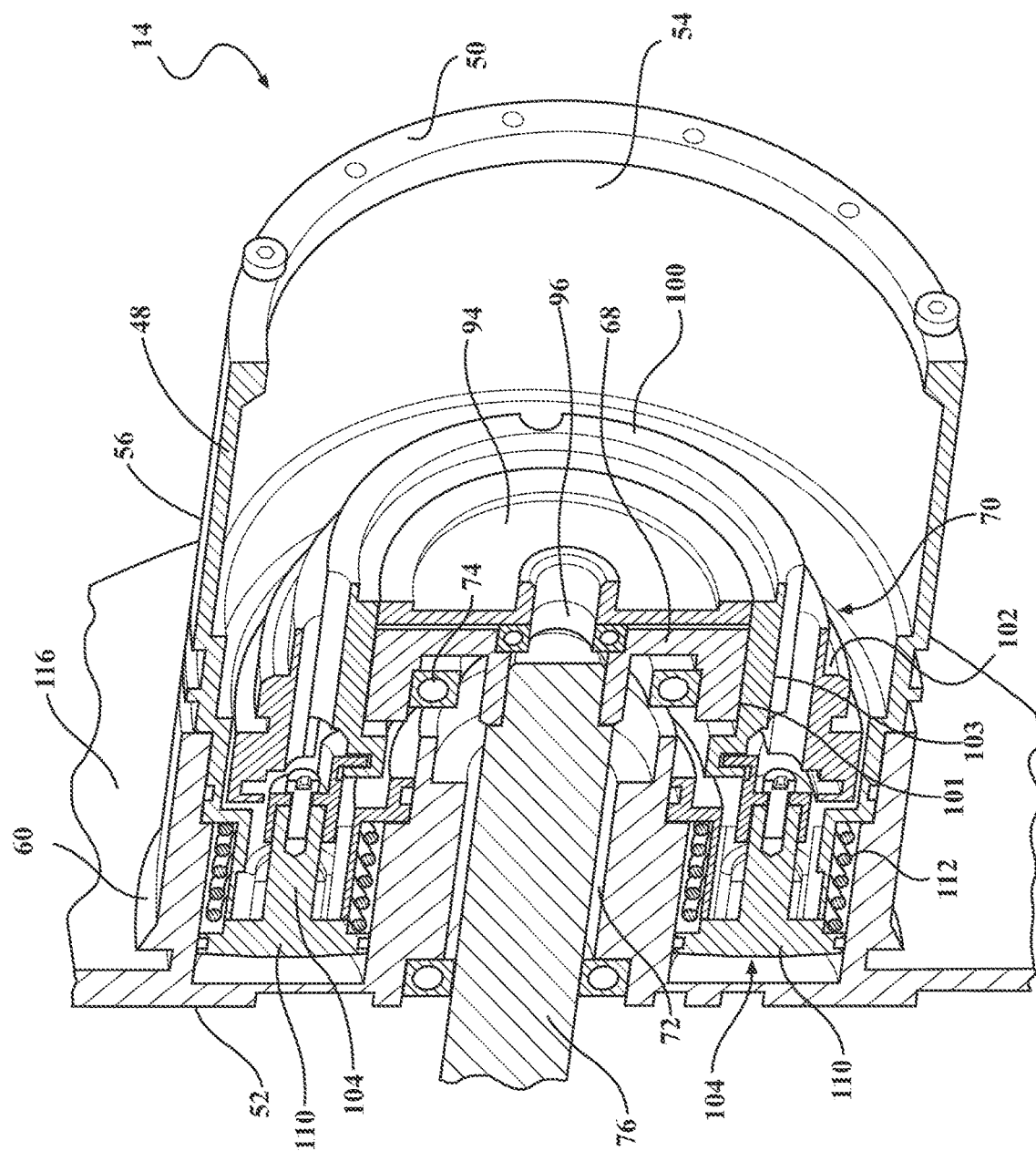
FIG. 14 is a perspective cross-sectional end view of a portion of the shifting and first stage module illustrating the plurality of actuators interconnected with respective ones of the low and high speed slider clutches and an output shaft extending axially from the output gear.

As previously discussed, the outer gear housing surface 56 of the gear housing 48 presents a second lubricant bearing surface/structure for rotatably supporting the rotor 20 relative to the stator 18. As further illustrated in FIG. 16, a portion of the outer gear housing surface 56 defines a plurality of lubricant supply holes 120 disposed in circumferentially spaced relationship to one another and in fluid communication with the second gap 58 for delivering lubricant to the second gap 58 to provide auxiliary or additional lubricant support of the rotor 20 relative to the stator 18. As best illustrated in FIG. 12, a restrictor plate 122 is disposed inside the gear housing 48 adjacent the second gear housing end 52. The restrictor plate 122 defines a plurality of restrictor channels 124, preferably rectangular or slotted in shape, for channeling and establishing restriction of the lubricant to the lubricant supply holes 120 and thus to the second gap 58 disposed along the second lubricant bearing/surface structure. As further illustrated in FIG. 16, the lubricant distribution plate manifold 116 also defines a lubricant supply channel 126 disposed in fluid communication with the restrictor channels 124 of the restrictor plate 122 for controlling the supply of lubricant thereto.

Figure 27:
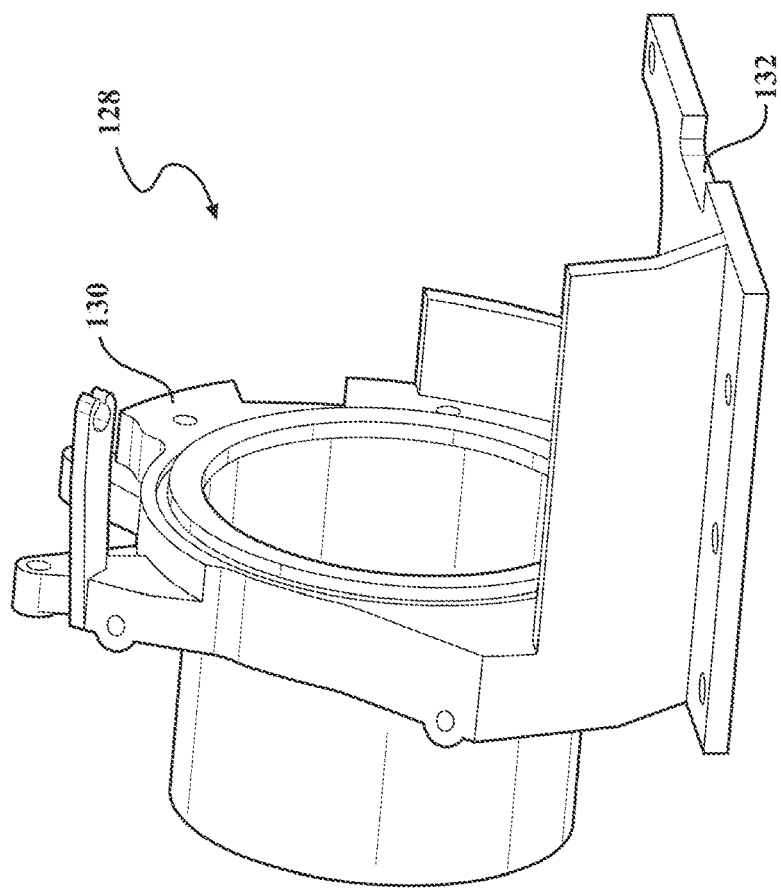
FIG. 27 is an alternative perspective view of the knuckle mounting structure.
Figure 26:
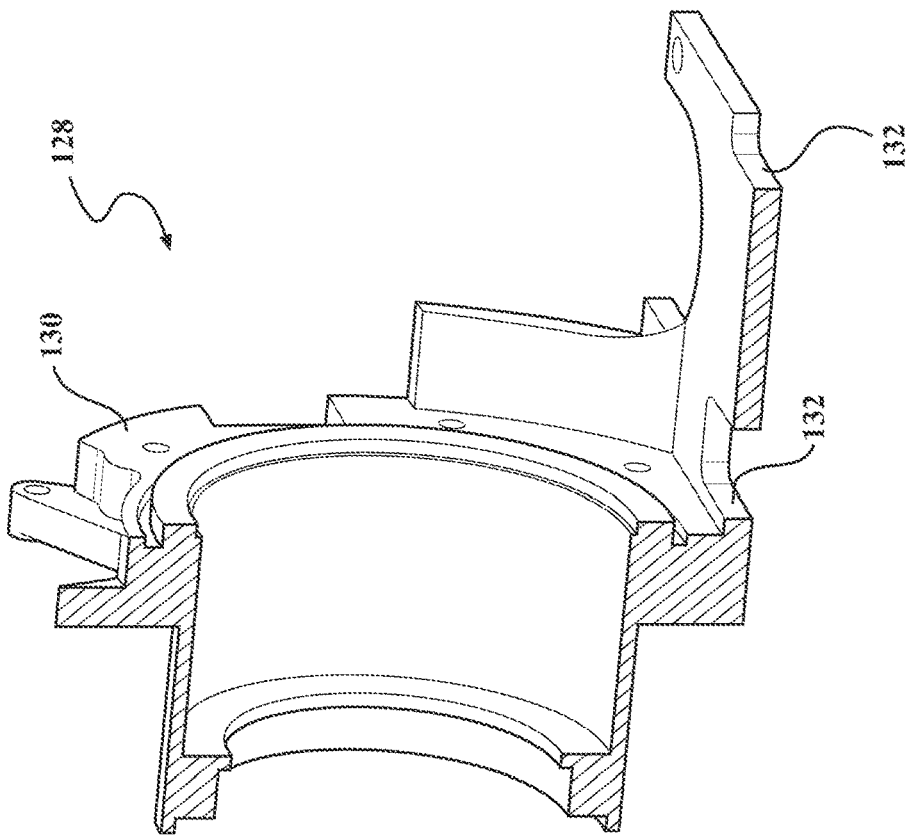
FIG. 26 is a fragmentary cross-sectional view of a knuckle mounting structure.

As illustrated in FIGS. 1 and 26-27, the lubricant supported electric motor assembly 10 includes a knuckle mounting structure 128 which performs a number of functions including (a) holding and supporting the electric motor module 12 and the shifting and first stage module 14, (b) connecting the lubricant supported electric motor assembly 10 to a beam axle, (c) holding the final drive module 16 and the related wheel bearings 88 (See, e.g., FIG. 1), (d) holding a brake and parking brake, and (e) allowing oil supply connections, electric connections and parking brake cable connections. For example, as best illustrated in FIGS. 26 and 27, the knuckle mounting structure 128 defines a plurality of pick-up points 130 for a brake caliper, and a plurality of through-holes 132 for allowing the knuckle mounting structure to be bolted to the axle. The lubricant supported electric motor assembly 10 also deeply integrates the wheel end functions and the powertrain functions via this "multifunctional knuckle" structure 128.

The lubricant supported electric motor assembly 10 described above provides a unique approach to achieving minimum weight and minimum package for use in a wheel-end drive application using a surface mounted permanent magnet motor with a distributed wave winding in conjunction with a two-speed drive system that produces high output (approximately 100 HP and 2000 ft lbs of torque), albeit with a motor support housing approximately the size of a gallon of milk. In other words, a very compact electric motor structure (SMPM with distributed wave winding, or another design with similar packaging properties) is combined with a 2-speed compact gearing to provide a wheel-end electric drive motor with smaller package size and light weight, but better torque and power density. As appreciated in view of the above disclosure, part of the drive system housed by the shifting and first stage module 14 is housed inside the electric motor module 12 in an internal rotor cavity 34 defined by the rotor 20. Integration is made possible by the plain bearings or other forms of a very compact and low drag high diameter bearings. Note that in the lubricant supported electric motor assembly 10 described above, the torque-transmitting structures and the vehicle weight-bearing structures are combined to share capabilities. This results in shorter force paths for loads and torques, which minimizes weight and package space requirements.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not regarded as a departure from the disclosure, and all such modifications are intended to be included within the scope of the disclosure.

What is claimed is:

1. A lubricant supported electric motor assembly comprising:
   an electric motor module including a stator and a rotor rotatably disposed within said stator to define a first gap therebetween;
   a lubricant disposed in said first gap for supporting said rotor relative to said stator;
   said rotor extending along an axis A between a first rotor end and a second rotor end to present an inner rotor surface defining an internal rotor cavity;
   a shifting and first stage module disposed within said internal rotor cavity and including a first planetary gear reducer assembly having a first sun gear operably connected with said rotor for simultaneous rotation therewith;
   said first planetary gear assembly including a plurality of first planet gears arranged radially outward of and operably connected to said first sun gear and a first ring gear arranged concentrically around and operably connected to said first planet gears for rotation about said axis A in response to rotation of said first sun gear;
   said shifting and first stage module including an output gear rotatably aligned on the axis A and selectively couplable to said first planetary gear reducer assembly for selective rotation therewith;
   a final drive module disposed adjacent said shifting and first stage module and including a second planetary gear reducer assembly operably coupled with said output gear for rotation therewith; and
   said shifting and first stage module including a low speed slider clutch and a high speed slider clutch both rotatable simultaneously with said output gear and each independently actuatable to axially slide the actuated low or high speed slider clutch relative to said output gear as well as the other non-actuated one of said low or high speed slider clutch from a neutral position wherein said low or high speed slider clutch is disposed in spaced and non-engaged relationship with said first planteary gear reducer assembly to an engaged position wherein the actuated low or high speed slider clutch is moved axially towards and into selectively coupled relationship with said first planetary gear assembly to establish said selective coupling between said first planetary gear assembly and said output gear;
   wherein said low speed slider clutch is disposed in selectively coupled relationship with said first ring gear in said respective engaged position to establish simultaneous rotation of said output gear with said first ring gear and a low gear arrangement for the lubricant supported electric motor assembly; and
   wherein said high speed slider clutch is disposed in selectively coupled relationship with said sun gear in said respective engaged position to establish simultaneous rotation of said output gear with said sun gear and a high gear arrangement for the lubricant supported electric motor assembly.

2. The lubricant supported electric motor assembly as set forth in claim 1, further comprising:
   said electric motor module including a rotor plate secured to said first rotor end and simultaneously rotatable about said axis A with said rotor;
   said first sun gear operably interconnected with said rotor plate and simultaneously rotatable about said axis A with said rotor plate to establish said operable connection between said electric motor module and said shifting and first stage module.

3. The lubricant supported electric motor assembly as set forth in claim 2, further comprising:
   said electric motor module including a motor support housing extending along the axis in surrounding relationship with said stator and said rotor from a first motor housing end to a second motor housing end;
   a motor housing cover secured to said first motor housing end and disposed adjacent said first rotor end of said rotor and said rotor plate;
   said rotor plate including a spindle extending axially away from said rotor plate in axially aligned relationship about the axis A; and
   said motor housing cover including a motor bearing disposed in aligned relationship with the axis A for receiving said spindle of said rotor plate and rotatably support said rotor relative to said motor housing cover.

4. The lubricant supported electric motor assembly as set forth in claim 3, further comprising:
   said shifting and first stage module including a gear housing disposed inside of said internal rotor cavity and extending from a first gear housing end disposed in adjacent relationship with said rotor plate and to a second gear housing end disposed in abutting and secured relationship with said second motor housing end to enclose said internal rotor cavity adjacent said second rotor end;
   said gear housing presenting an outer gear housing surface extending between said first and second gear housing ends and disposed in spaced relationship with said inner rotor surface of said rotor to define a second gap therebetween; and said lubricant disposed in said second gap to provide auxiliary support of said rotor relative to said stator.

5. The lubricant supported motor assembly as set forth in claim 4, further comprising:

said gear housing defining an internal gear cavity extending between said first and second gear housings;

said first planetary gear reducer assembly disposed inside of said internal gear cavity adjacent said first gear housing end; and said gear housing defining an annular shoulder extending radially outwardly from said outer gear housing surface adjacent said second gear housing end and into abutting relationship with said second rotor end of said rotor to axially place of said first planetary gear reducer assembly and said rotor relative to one another and prevent lubricant from escaping said second gap adjacent said second rotor end of said rotor.

6. The lubricant supported electric motor assembly as set forth in claim 5, wherein said second gap tapers radially outwardly from said second gear housing end to said first gear housing end.

7. The lubricant supported electric motor assembly as set forth in claim 4, said shifting and first stage module including a plurality of actuators arranged about said second gear housing end of said gear housing in circumferentially spaced relationship to one another for actuating said low and high speed clutches; and said plurality of actuators including at least one low speed actuator operably connected to said low speed slider clutch and at least one high speed actuator operably connected to said high speed slider clutch.

8. The lubricant supported electric motor assembly as set forth in claim 7, wherein said at least one low speed actuator including a pair of low speed actuators disposed in diametrically opposed relationship to one another and each operably connected to said low speed slider clutch, and wherein said at least one high speed actuator includes a pair of high speed actuators disposed in diametrically opposed relationship to one another and each operably connected to said high speed slider clutch.

9. The lubricant supported electric motor assembly as set forth in claim 7, said gear housing defining a plurality of actuator channels disposed adjacent said second gear housing end and each receiving a respective one of said plurality of actuators;

each of said plurality of actuators including a piston slideably received in said respective actuator channel and a biasing member for biasing said piston towards said second gear housing end and into said respective engaged position.

10. The lubricant supported electric motor assembly as set forth in claim 9, further comprising:

said second gear housing end of said gear housing defining a plurality of fluid passageways each disposed in respective communication with a respective one of said plurality of actuator channels for selectively delivering hydraulic pressure to the respective one of said plurality of actuator channels to overcome the bias of said biasing member and drive said respective piston towards said first gear housing to slide said respective one of said slider clutches from said neutral position into said engaged position.

11. The lubricant supported electric motor assembly as set forth in claim 10, further comprising:

said second gear housing end of said gear housing including a distribution plate manifold defining a plurality of fluid channels each disposed in fluid communication with a respective one of said plurality of fluid channels for selectively delivering fluid to said plurality of actuator channels to establish said hydraulic pressure.

12. The lubricant supported electric motor assembly as set forth in claim 7, further comprising:

said secondary planetary gear reducer assembly of said final drive module including a second sun gear rotatably aligned along said axis A and operably interconnected with said drive shaft to rotatably couple said second sun gear with said output gear and establish simultaneous rotation of said second sun gear and said output gear;

said second planetary gear reducer assembly including a plurality of second planet gears arranged radially outwardly of and operably connected to said second sun gear and a second ring gear arranged concentrically around and operably connected to said plurality of second planet gears;

said second planetary gear reducer assembly including a planet carrier rotatably supporting said plurality of second planet gears and rotatable about said axis A in response to rotation of said second sun gear.

13. The lubricant supported electric motor assembly as set forth in claim 12, further comprising:

said planet carrier including a wheel flange shaft extending along said axis; and a wheel flange coupled to said wheel flange shaft for coupling with a wheel of a vehicle.

14. The lubricant supported electric motor assembly as set forth in claim 4, further comprising:

said gear housing defining an output shaft channel extending along said axis A from said second gear housing end to said output gear;

an output shaft bearing housed in said gear housing radially outside of and adjacent said output shaft channel; and an output shaft rotatably supported by said output shaft bearing and extending axially through said output shaft channel from said output gear and into operable connection with said final drive module.

15. The lubricant supported electric motor assembly as set forth in claim 1, wherein said low and high speed slider clutches being simultaneously actuatable to simultaneously slide said low and high speed slider clutches from said neutral positions to said engaged positions and simultaneously dispose said low speed slider clutch in selectively coupled relationship with said first ring gear and said high speed slider clutch in selectively coupled relationship with said sun gear to lock rotation of said output gear and establish a parked gear arrangement for the lubricant supported electric motor assembly.

16. The lubricant supported electric motor assembly as set forth in claim 1, further comprising:

said output gear presenting an outer sliding gear surface extending in circumferentially about the axis A;

said high speed slider clutch being cylindrical shaped and concentrically and slideably disposed on said outer sliding gear surface of said output gear;

said high speed slider clutch presenting an outer sliding clutch surface extending circumferentially about the axis A in radially spaced relationship with said outer sliding gear surface; and said low speed slider clutch being cylindrical shaped and concentrically and slideably disposed on said outer sliding clutch surface of said high speed slider clutch.

17. The lubricant supported electric motor assembly as set forth in claim 16, further comprising:
an annular sun gear flange extending radially from said first sun gear adjacent said output gear and rotatable simultaneously with said first sun gear;
a ring gear flange extending axially from said first ring gear in concentric and radially spaced relationship with the axis A and rotatable simultaneously with said first ring gear;
said high speed slider clutch disposed in coupled relationship with said annular sun gear flange in said respective engaged position; and
said low speed slider clutch disposed in coupled relationship with said ring gear flange in said respective engaged position.

\* \* \* \* \*